(12) United States Patent
Nakamura et al.

(10) Patent No.: US 11,122,230 B2
(45) Date of Patent: Sep. 14, 2021

(54) IMAGING APPARATUS AND IMAGING METHOD

(71) Applicant: SONY SEMICONDUCTOR SOLUTIONS CORPORATION, Kanagawa (JP)

(72) Inventors: Ryosuke Nakamura, Kanagawa (JP); Yorito Sakano, Kanagawa (JP); Atsushi Suzuki, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/755,397

(22) PCT Filed: Oct. 2, 2018

(86) PCT No.: PCT/JP2018/036877
§ 371 (c)(1),
(2) Date: Apr. 10, 2020

(87) PCT Pub. No.: WO2019/082614
PCT Pub. Date: May 2, 2019

(65) Prior Publication Data
US 2021/0211599 A1  Jul. 8, 2021

(30) Foreign Application Priority Data

Oct. 27, 2017  (JP) .............................. JP2017-208118

(51) Int. Cl.
*H04N 5/3745* (2011.01)
*H04N 5/355* (2011.01)
*H04N 5/378* (2011.01)

(52) U.S. Cl.
CPC ....... *H04N 5/37452* (2013.01); *H04N 5/3559* (2013.01); *H04N 5/378* (2013.01)

(58) Field of Classification Search
CPC .. H04N 5/37452; H04N 5/378; H04N 5/3559; H04N 5/35563; H01L 27/1463;
(Continued)

(56) References Cited

U.S. PATENT DOCUMENTS

2018/0308883 A1* 10/2018 Yanagita ............ H04N 5/37452
2020/0137325 A1*  4/2020 Mori ................. H01L 27/14609
(Continued)

FOREIGN PATENT DOCUMENTS

CN    108140661 A    6/2018
JP    2005-328493 A  11/2005
(Continued)

OTHER PUBLICATIONS

International Search Report and Written Opinion of PCT Application No. PCT/JP2018/036877, dated Dec. 11, 2018, 08 pages of ISRWO.

*Primary Examiner* — Nhan T Tran
(74) *Attorney, Agent, or Firm* — Chip Law Group

(57) ABSTRACT

An imaging apparatus of the present disclosure includes: a first switch that couples a first light-receiving device and a first charge accumulation section to each other; a second switch that couples a predetermined node and the first charge accumulation section to each other; a third switch that applies a predetermined voltage to the predetermined node; a fourth switch that couples a second light-receiving device and a second charge accumulation section to each other; a fifth switch that couples the second charge accumulation section and the predetermined node to each other; an output section that outputs a pixel voltage; a driving section; and a processor that determines first to fourth values. The driving section turns on the second and third switches and turning off the first, fourth, and fifth switches to the off state in a first period, turns off the third switch and turns on the fifth switch in a second period, turns on the fourth switch in a third (Continued)

period, and turns off the fourth switch in a fourth period. The processor determines the third value on the basis of the pixel voltages in the second and fourth periods.

10 Claims, 16 Drawing Sheets

(58) Field of Classification Search
CPC ......... H01L 27/14623; H01L 27/14605; H01L 27/14629; H01L 27/14621; H01L 27/14645; H01L 27/14607; H01L 27/14627; H01L 27/14665
See application file for complete search history.

(56) References Cited

U.S. PATENT DOCUMENTS

| 2020/0162691 | A1* | 5/2020 | Mori | H04N 5/378 |
| 2021/0127079 | A1* | 4/2021 | Shim | H04N 5/35563 |

FOREIGN PATENT DOCUMENTS

| JP | 2005-332880 A | 12/2005 | |
| JP | 2017-084892 A | 5/2017 | |
| WO | 2017/010260 A1 | 1/2017 | |
| WO | 2017/073322 A1 | 5/2017 | |
| WO | WO-2017073322 A1 * | 5/2017 | ......... H01L 27/1463 |

* cited by examiner

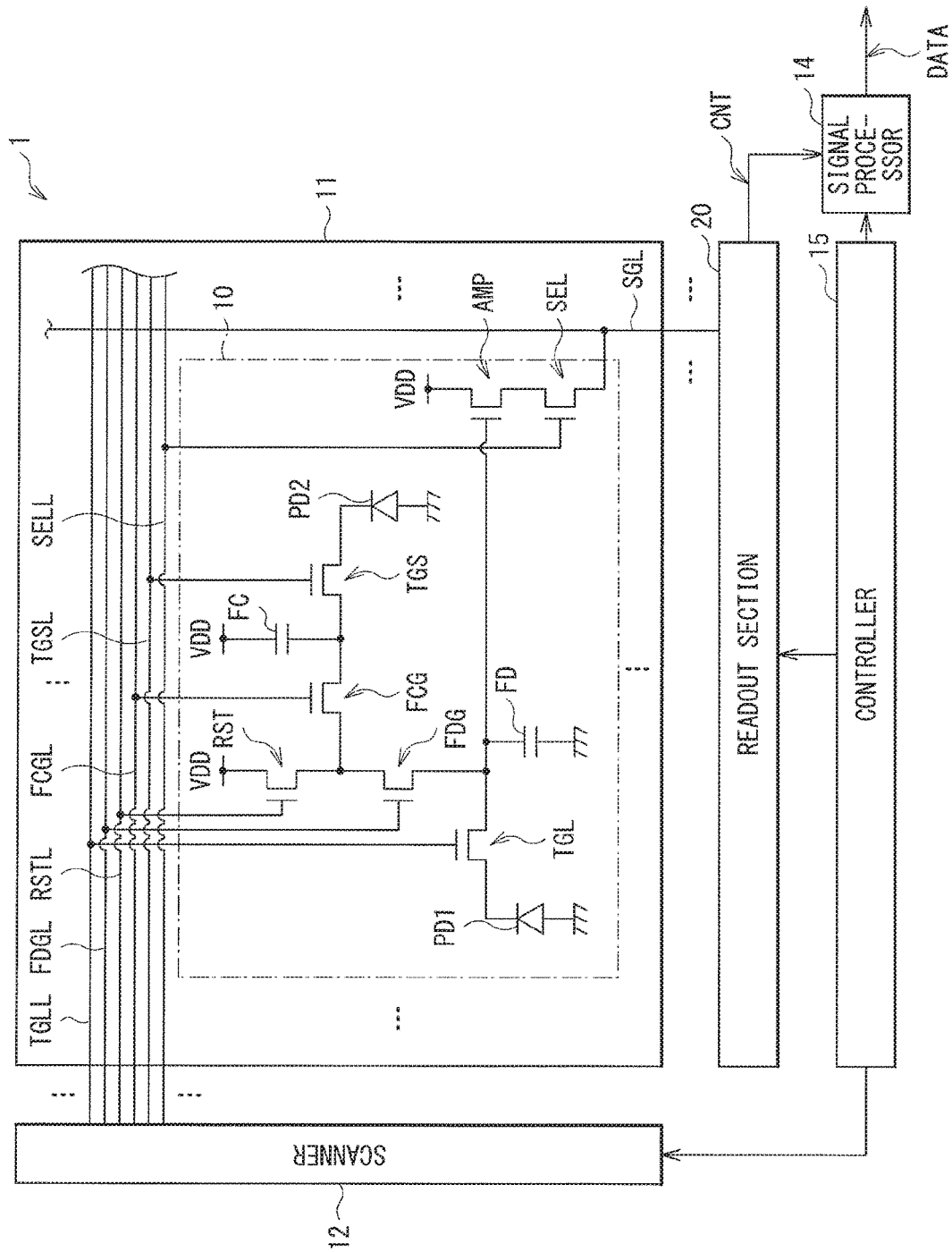
[FIG. 1]

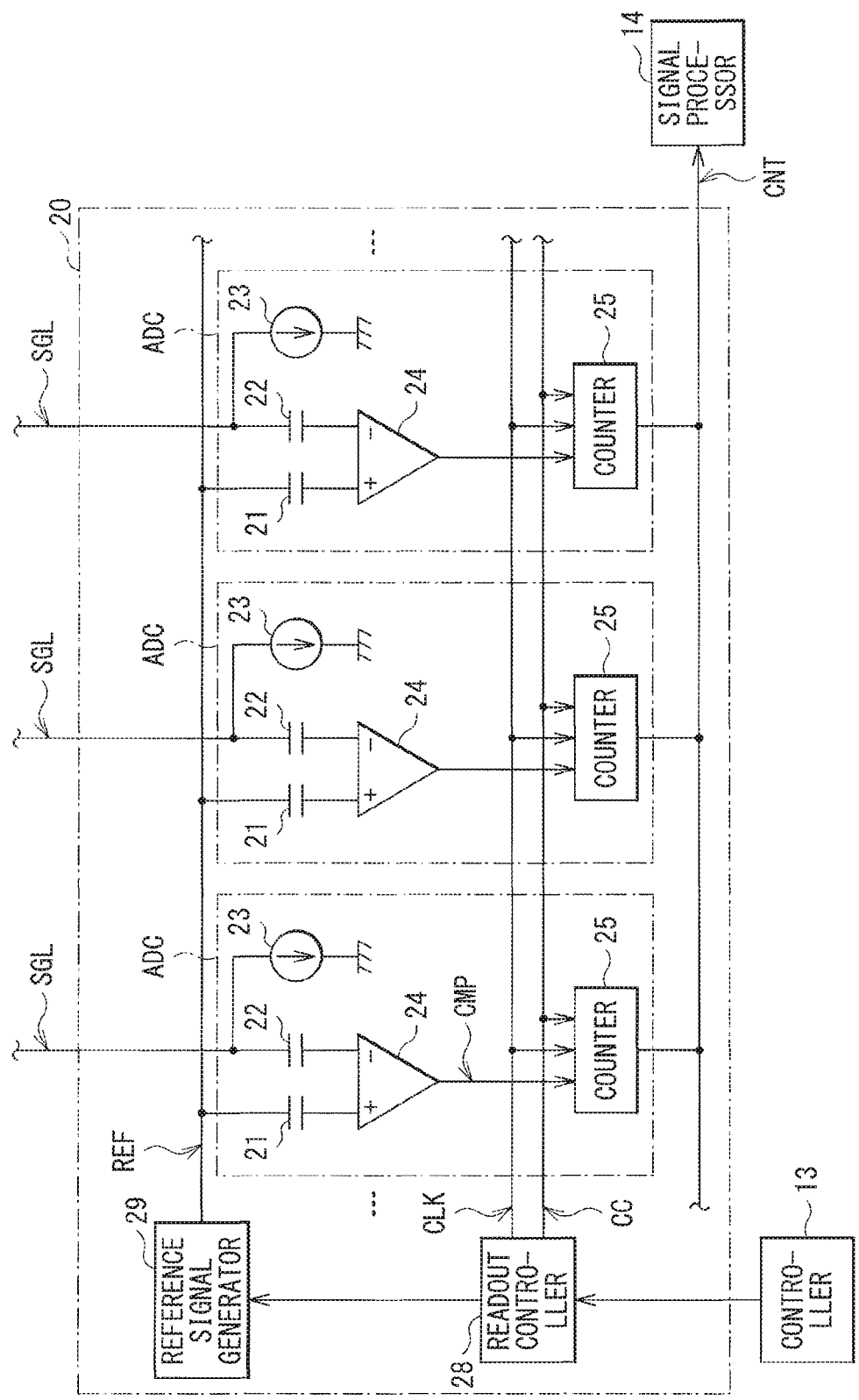
[FIG. 2]

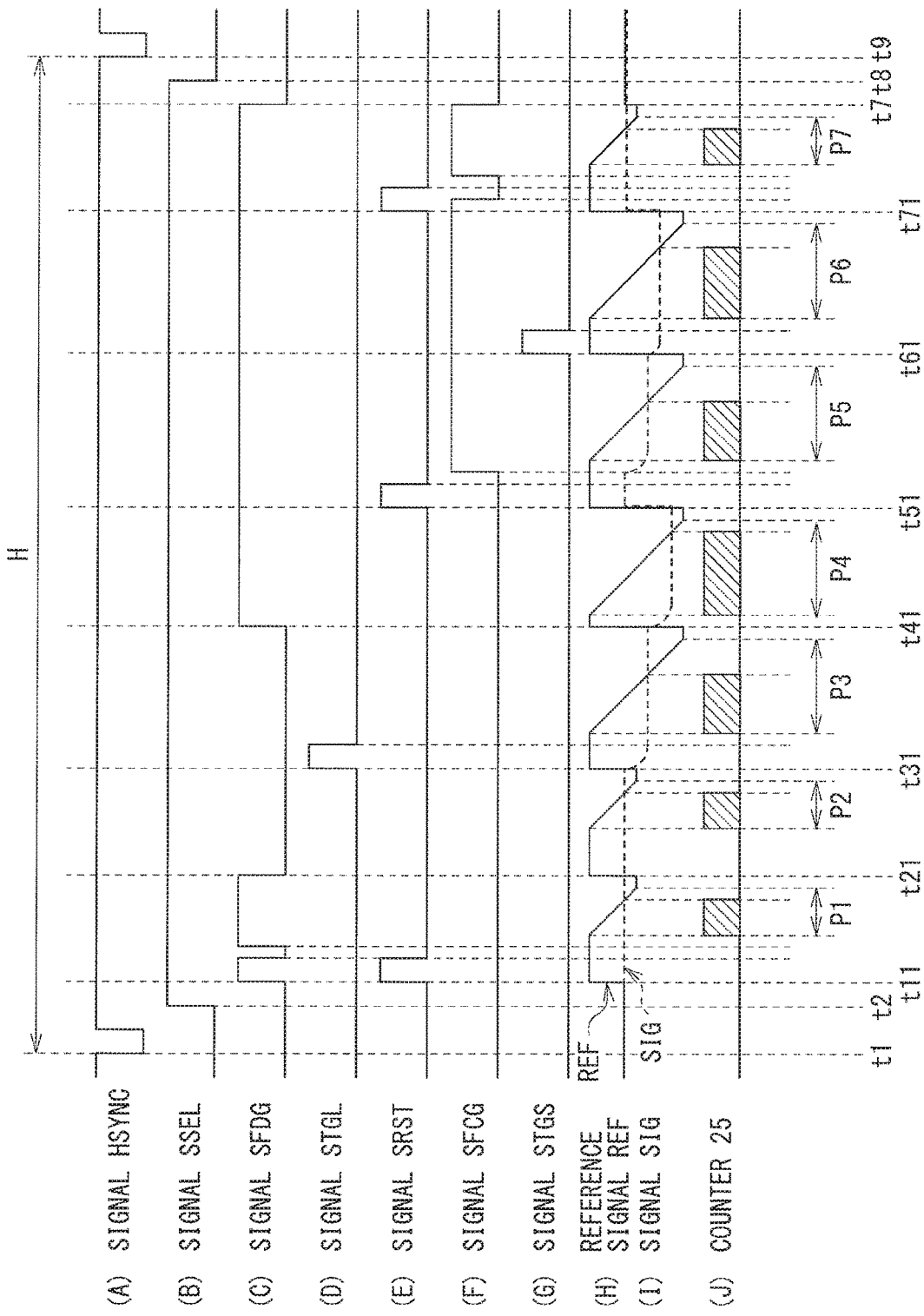

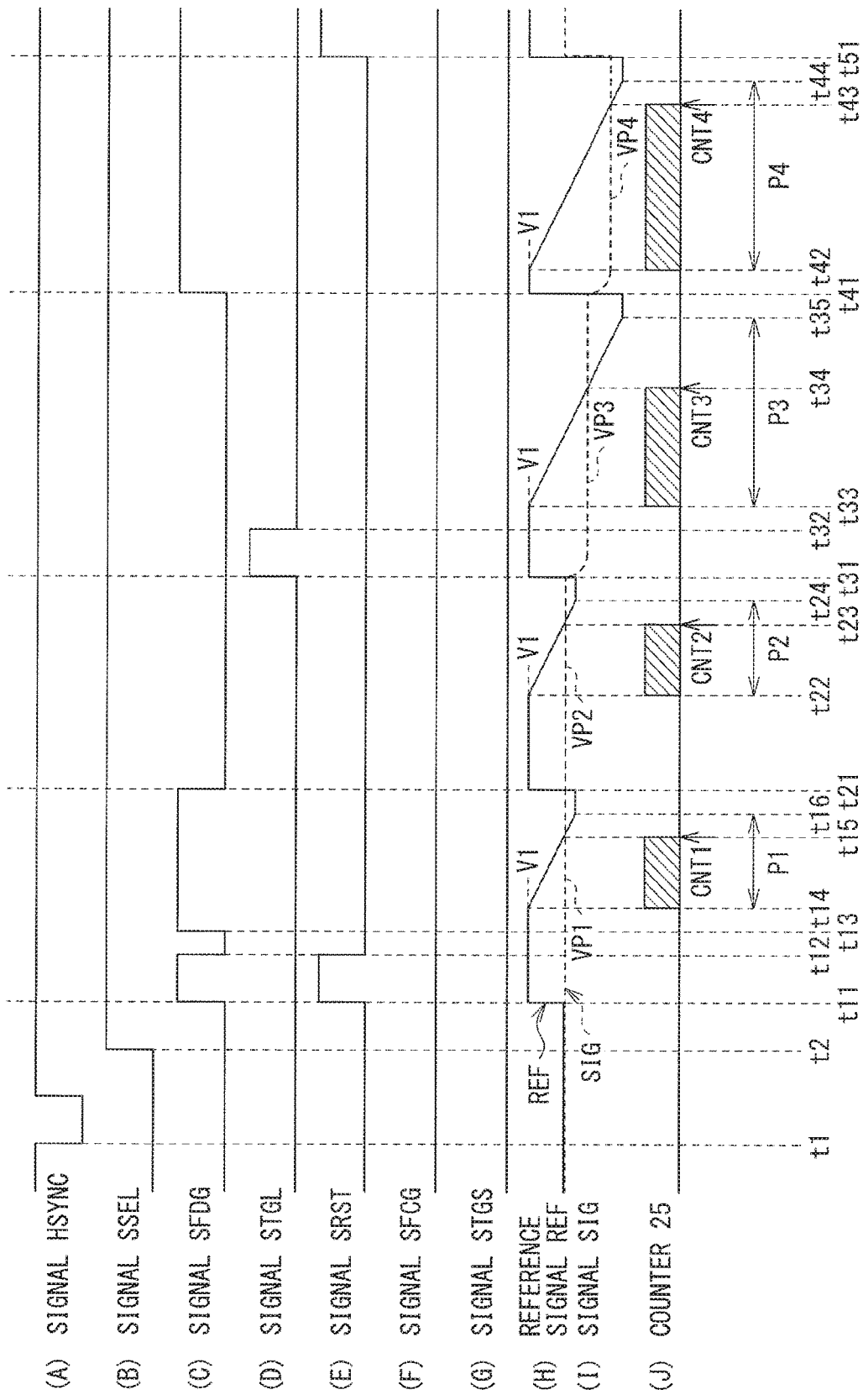

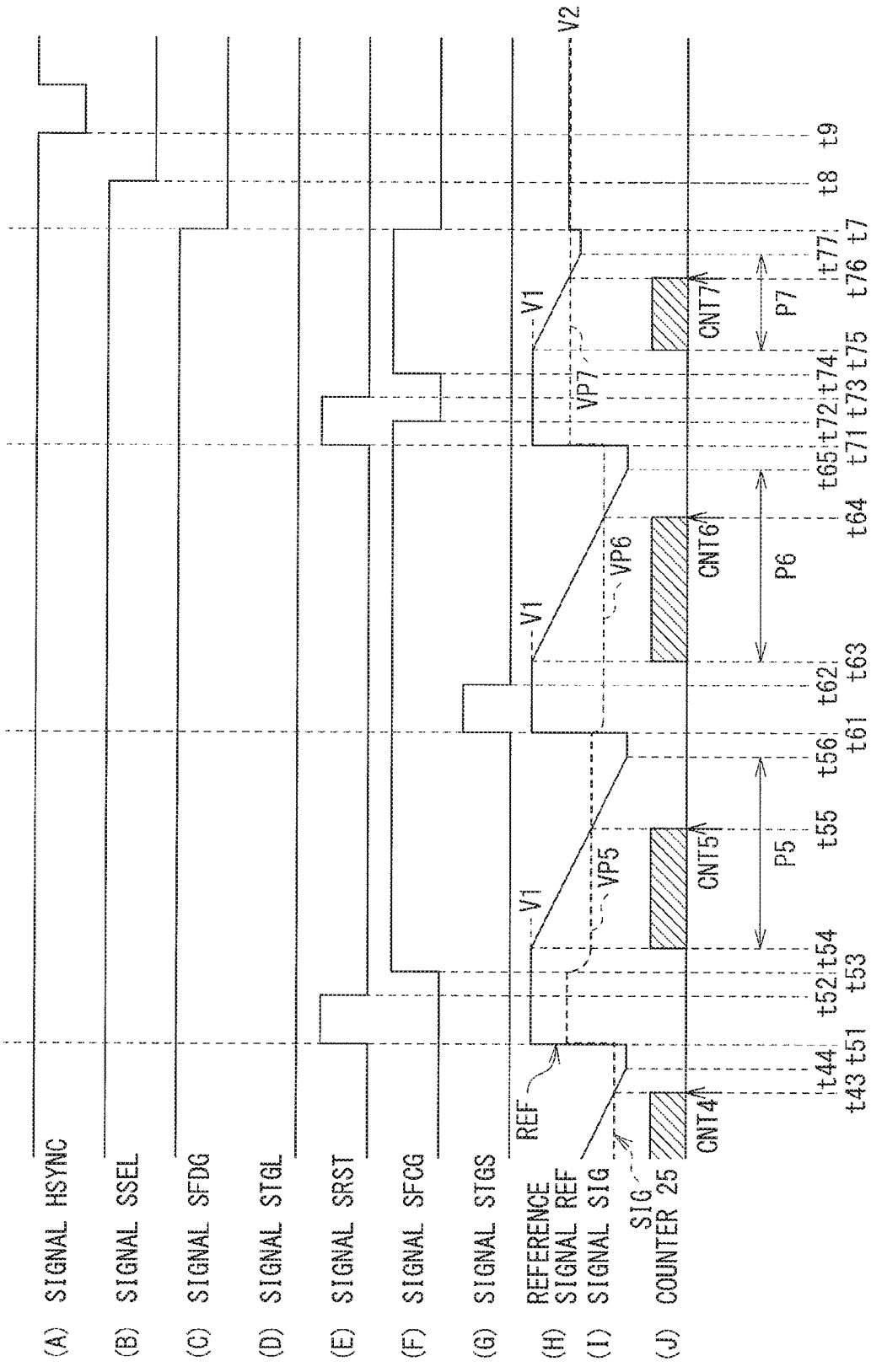

[FIG. 5A]
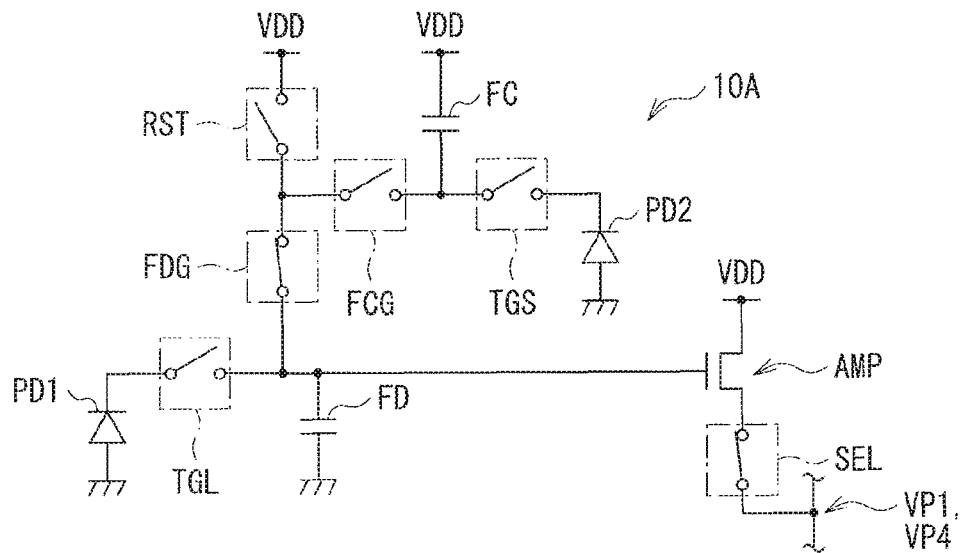
[FIG. 5B]
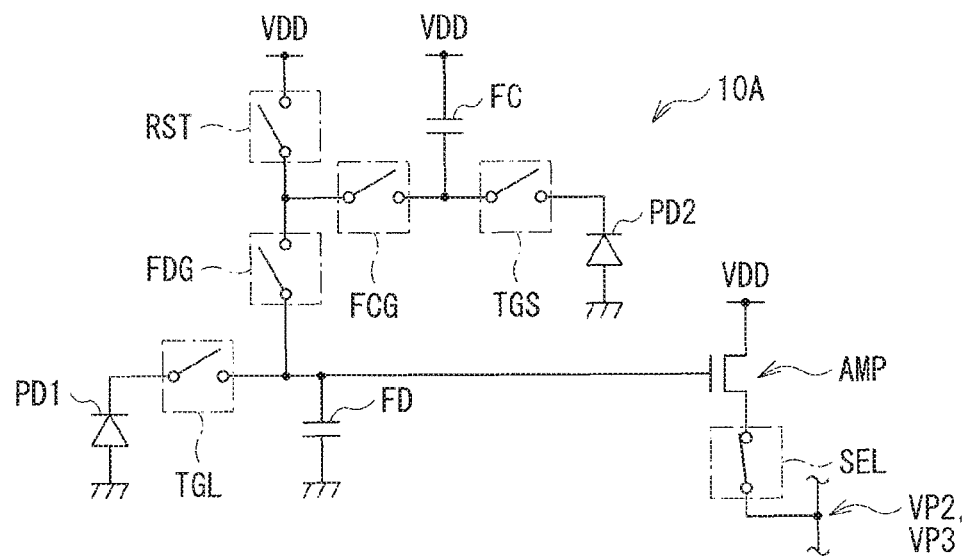

[FIG. 5C]
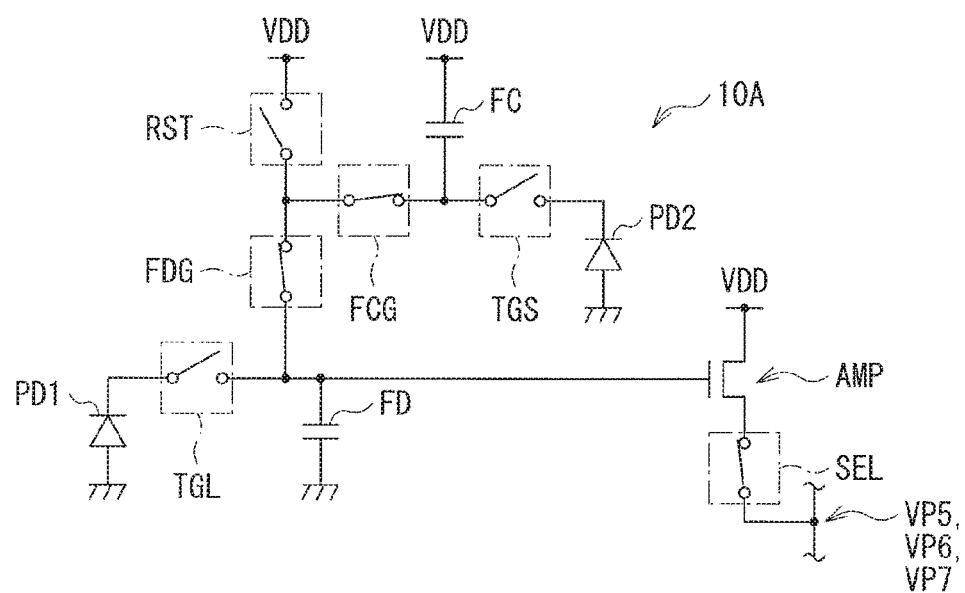

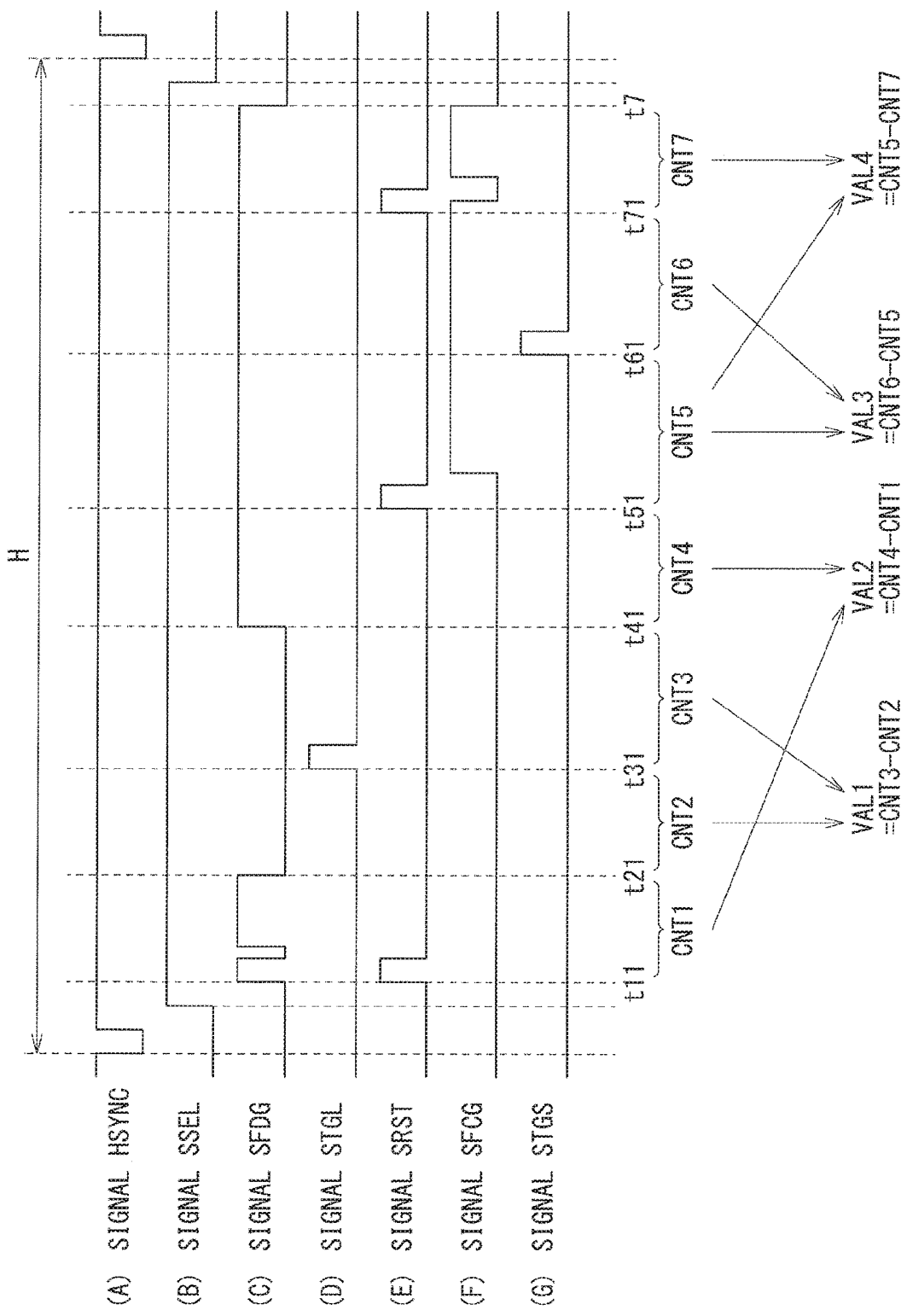
[FIG. 6]

[FIG. 7]
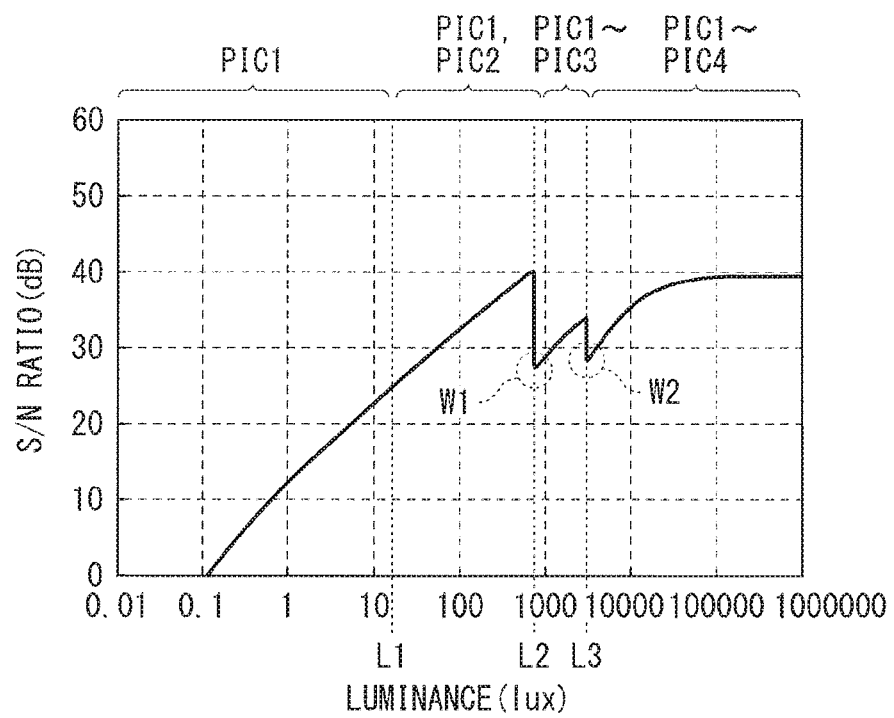

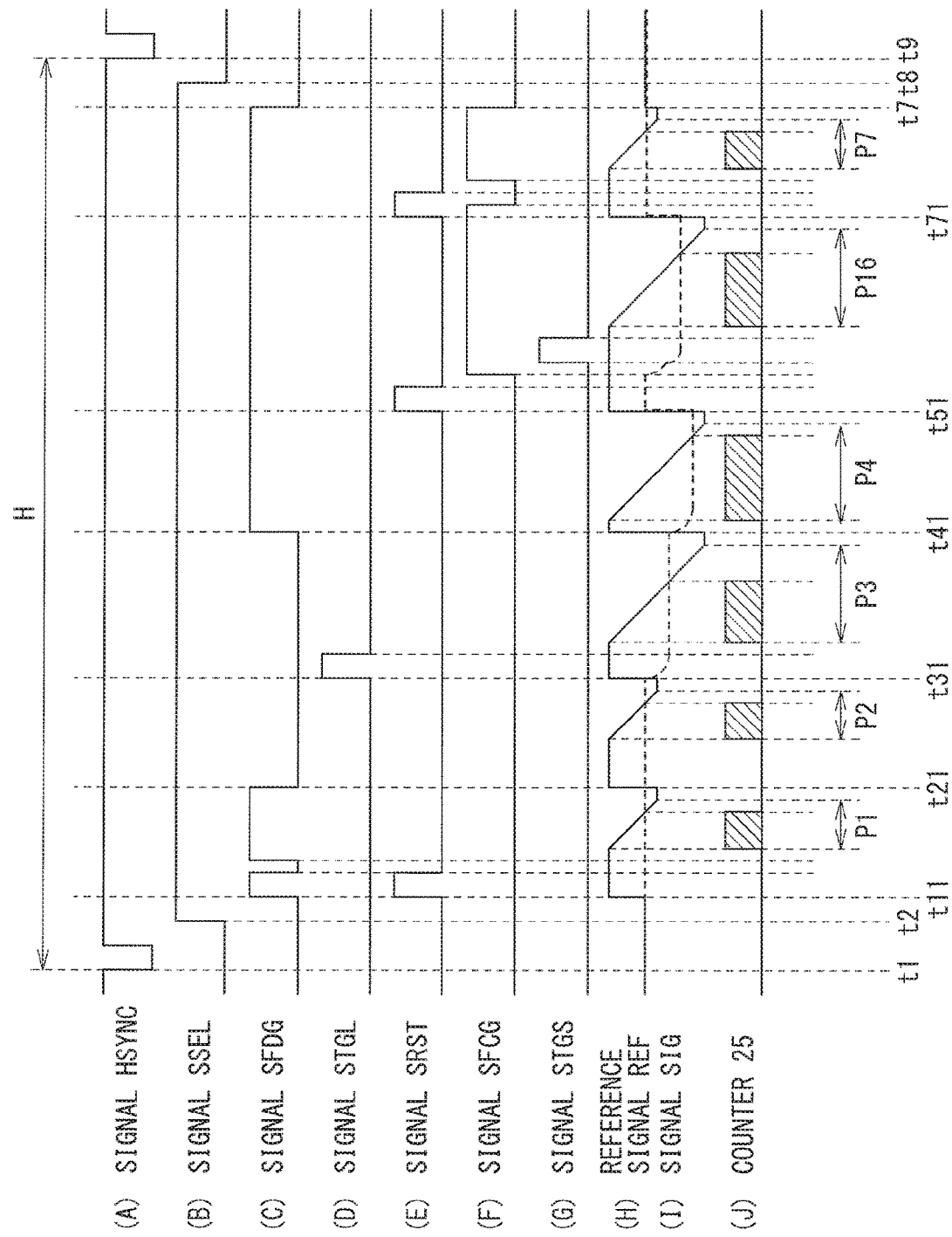
[FIG. 8]

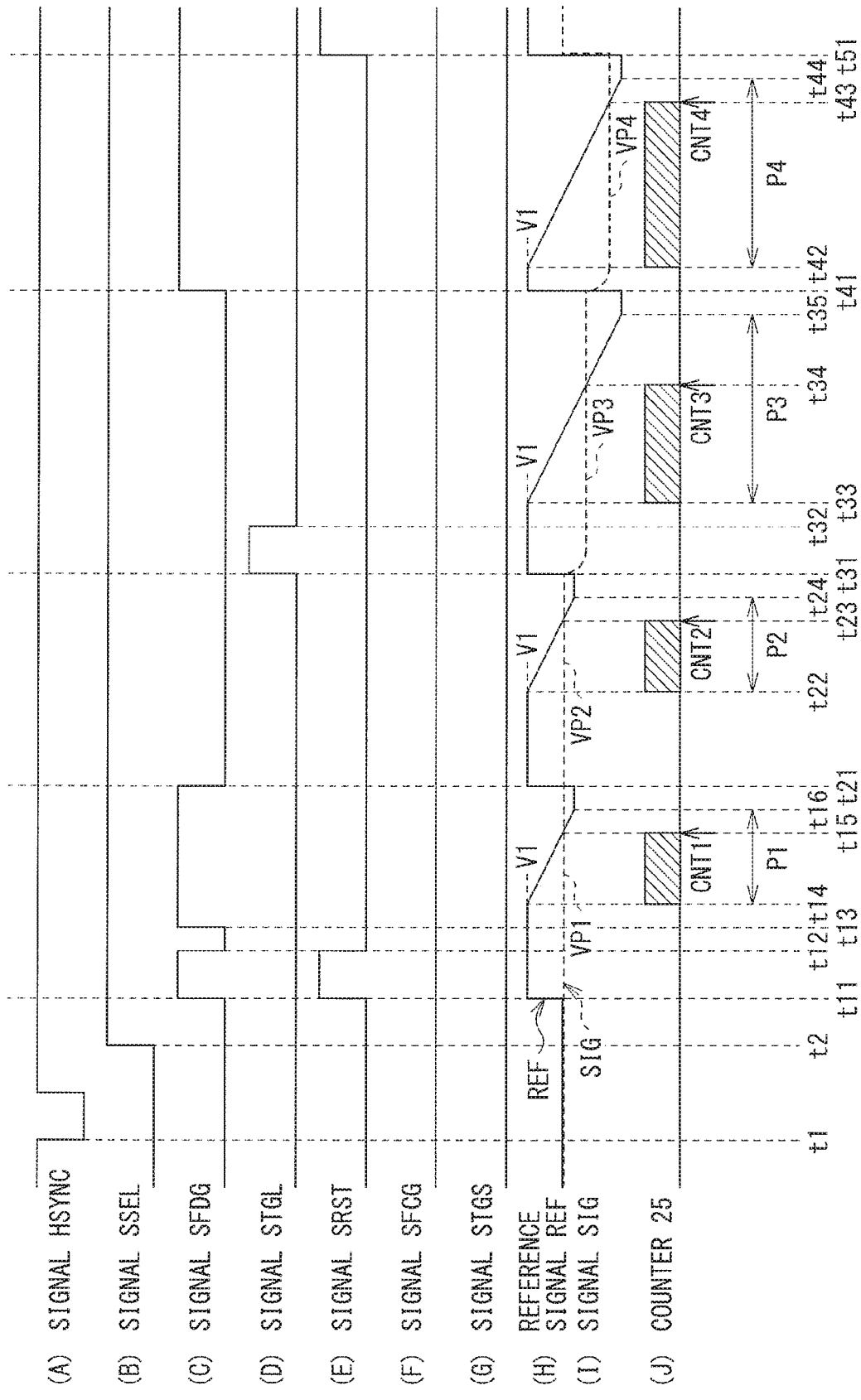

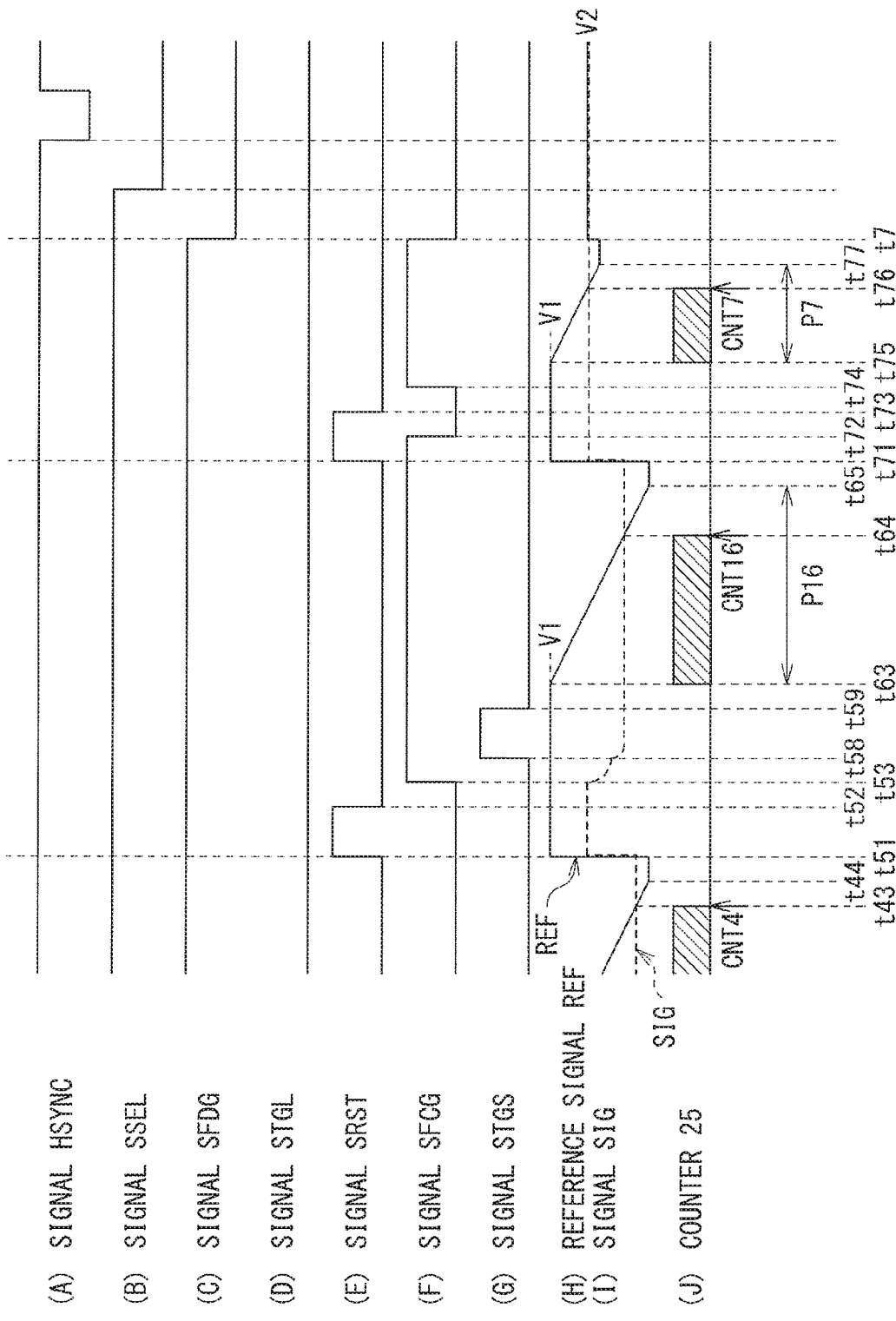
[FIG. 9B]

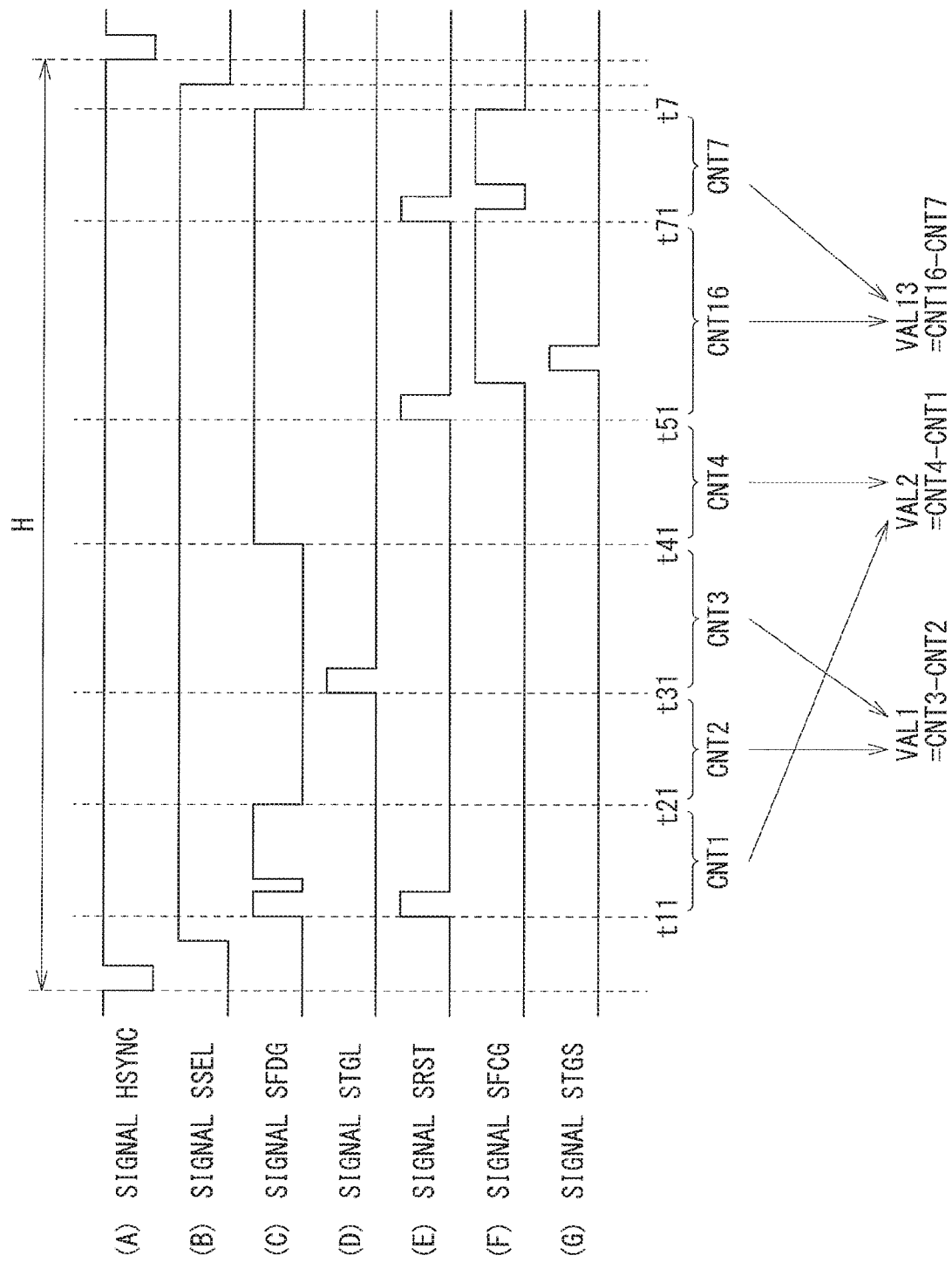

[FIG. 11]
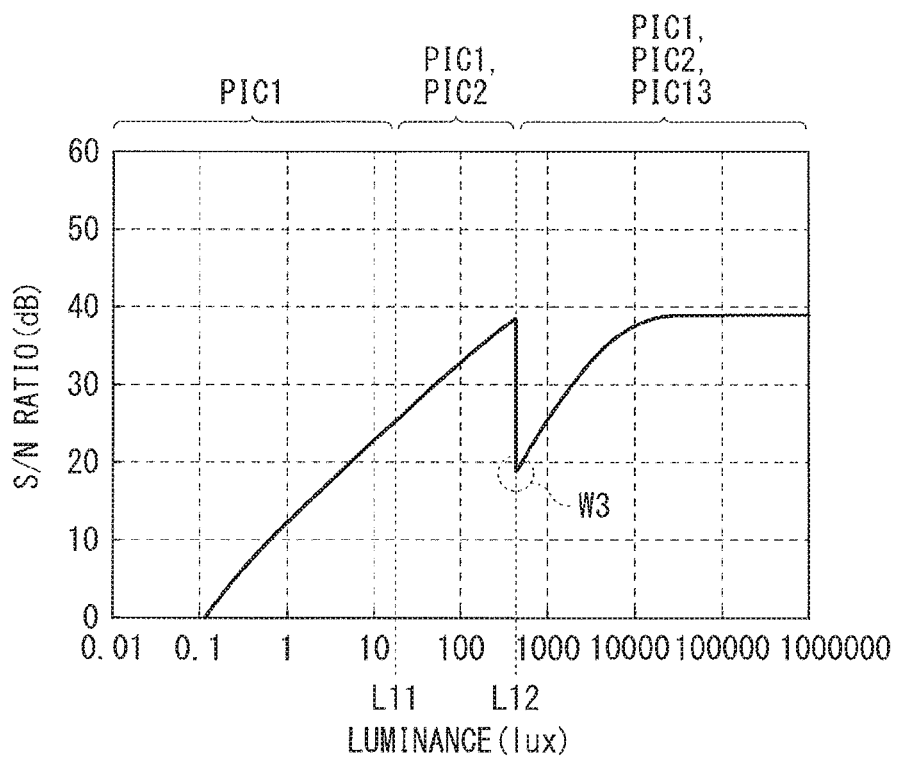

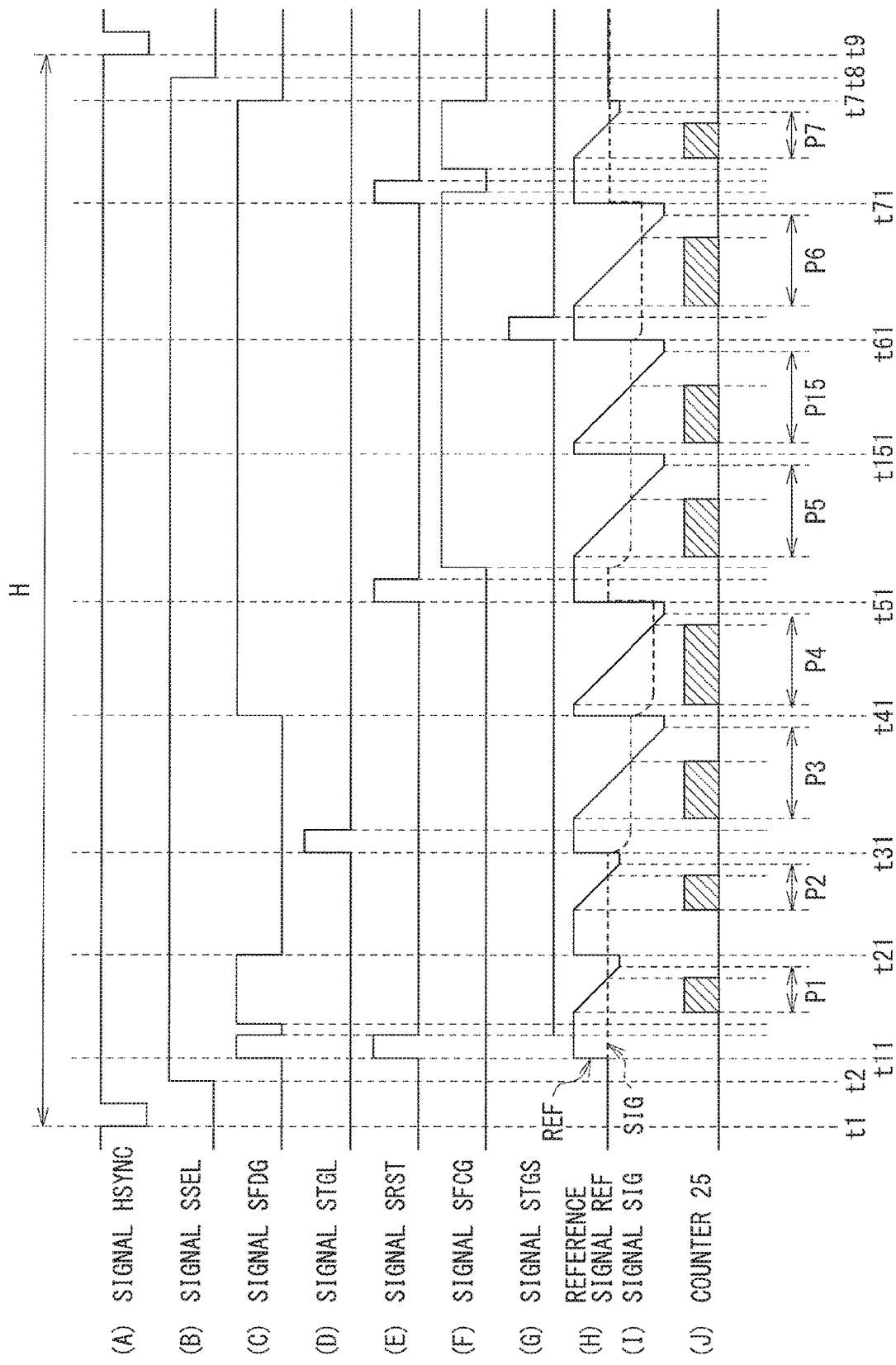

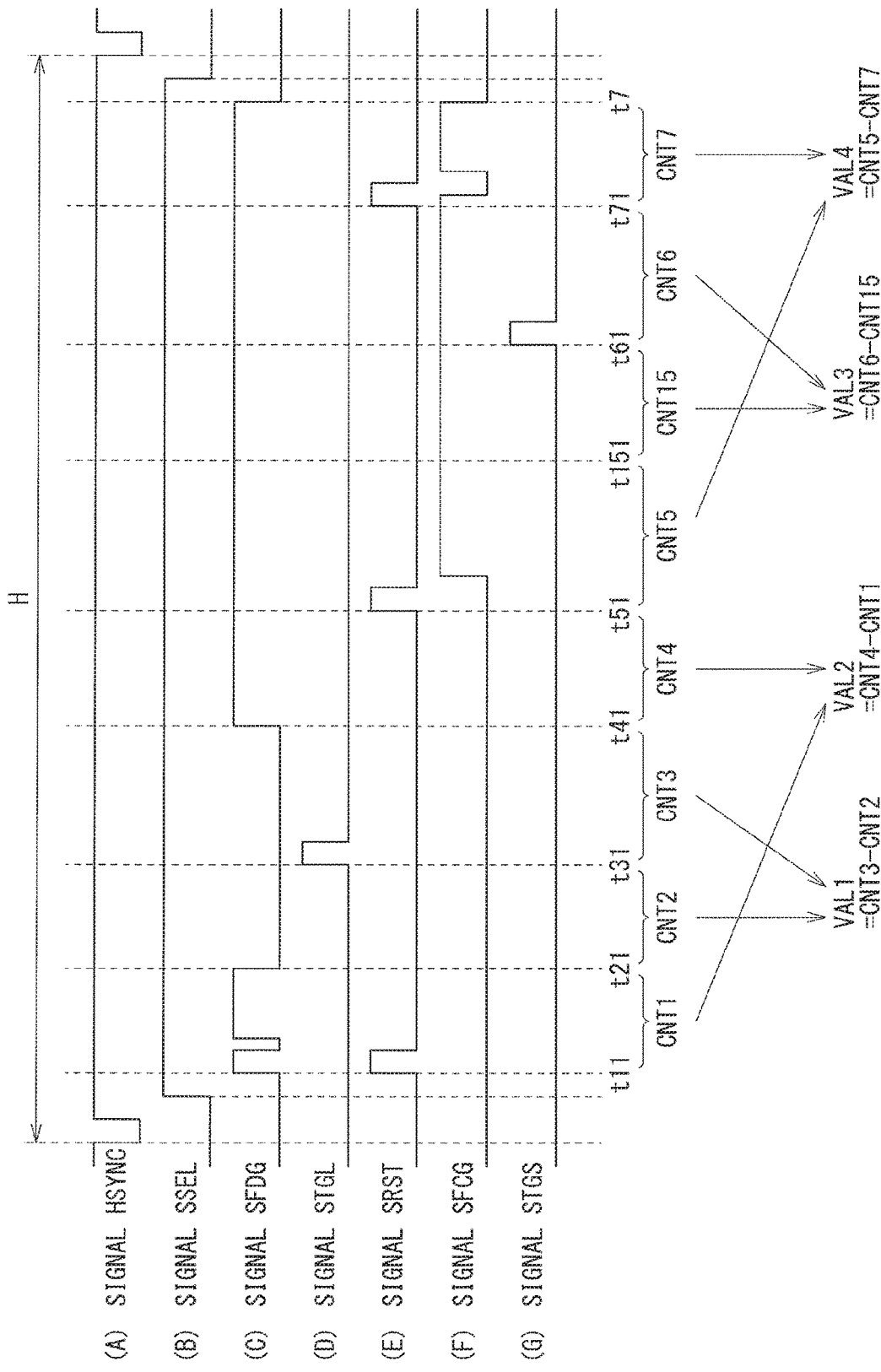

IMAGING APPARATUS AND IMAGING METHOD

CROSS REFERENCE TO RELATED APPLICATIONS

This application is a U.S. National Phase of International Patent Application No. PCT/JP2018/036877 filed on Oct. 2, 2018, which claims priority benefit of Japanese Patent Application No. JP 2017-208118 filed in the Japan Patent Office on Oct. 27, 2017. Each of the above-referenced applications is hereby incorporated herein by reference in its entirety.

TECHNICAL FIELD

The present disclosure relates to an imaging apparatus that performs an imaging operation, and an imaging method used in such an imaging apparatus.

BACKGROUND ART

In imaging apparatuses, a wide dynamic range is desired. For example, PTL 1 discloses an imaging apparatus including a photodiode and a storage capacitor that accumulates photoelectric charges overflowing from the photodiode, and expands a dynamic range.

CITATION LIST

Patent Literature

PTL 1: Japanese Unexamined Patent Application Publication No. 2005-328493

SUMMARY OF THE INVENTION

In imaging apparatuses, high image quality of a captured image is desired, and further improvement in the image quality is expected.

It is desirable to provide an imaging apparatus and imaging method that make it possible to enhance image quality of a captured image.

An imaging apparatus according to an embodiment of the present disclosure includes: a first light-receiving device and a second light-receiving device; a first charge accumulation section and a second charge accumulation section; a first switch; a second switch; a third switch; a fifth switch; an output section; a driving section; and a processor. The first switch is turned to an on state to couple the first light-receiving device and the first charge accumulation section to each other. The second switch is turned to the on state to couple a predetermined node and the first charge accumulation section to each other. The third switch is turned to the on state to apply a predetermined voltage to the predetermined node. The fourth switch is turned to the on state to couple the second light-receiving device and the second charge accumulation section to each other. The fifth switch is turned to the on state to couple the second charge accumulation section and the predetermined node to each other. The driving section drives each of the switches. The processor determines a first value, a second value, a third value, and a fourth value on the basis of a pixel voltage, and generates a pixel value on the basis of these values. The above-described driving section turns the second switch and the third switch to the on state and turns the first switch, the fourth switch, and the fifth switch to the off state in a first period. The driving section turns the third switch to the off state and turns the fifth switch to the on state in a second period subsequent to the first period. The driving section turns the fourth switch to the on state in a third period subsequent to the second period, and turns the fourth switch to the off state in a fourth period subsequent to the third period. The processor determines the third value on the basis of the pixel voltage in the second period and the pixel voltage in the fourth period.

An imaging method according to an embodiment of the present disclosure including: driving respective switches of an imaging pixel, the imaging pixel including a first light-receiving device and a second light-receiving device, a first charge accumulation section and a second charge accumulation section, a first switch, a second switch, a third switch, a fourth switch, a fifth switch, and an output section, the first switch that is turned to an on state to couple the first light-receiving device and the first charge accumulation section to each other, the second switch that is turned to the on state to couple a predetermined node and the first charge accumulation section to each other, the third switch that is turned to the on state to apply a predetermined voltage to the predetermined node, the fourth switch that is turned to the on state to couple the second light-receiving device and the second charge accumulation section to each other, the fifth switch that is turned to the on state to couple the second charge accumulation section and the predetermined node to each other, and the output section that outputs a pixel voltage corresponding to a voltage in the first charge accumulation section; determining a first value, a second value, a third value, and a fourth value on the basis of the pixel voltage, and generating a pixel value on the basis of these values; turning the second switch and the third switch to the on state and turning the first switch, the fourth switch, and the fifth switch to the off state in a first period; turning the third switch to the off state and turning the fifth switch to the on state in a second period subsequent to the first period; turning the fourth switch to the on state in a third period subsequent to the second period; turning the fourth switch to the off state in a fourth period subsequent to the third period; and determining the third value on the basis of the pixel voltage in the second period and the pixel voltage in the fourth period.

In the imaging apparatus and the imaging method according to the embodiments of the present disclosure, in the first period, the second switch and the third switch are turned to the on state and first switch, the fourth switch, and the fifth switch are turned to the off state. In the second period subsequent to the first period, the third switch is turned to the off state and the fifth switch is turned to the on state. In the third period subsequent to the second period, the fourth switch is turned to the on state, and in the fourth period subsequent to the third period, the fourth switch is turned to the off state. Then, the third value is determined on the basis of the pixel voltage in the second period and the pixel voltage in the fourth period. Then, the pixel value is generated on the basis of the first value, the second value, the third value, and the fourth value.

According to the imaging apparatus and the imaging method in the embodiments of the present disclosure, the second switch and third switch are turned to the on state and the first switch, fourth switch, and the fifth switch are turned to the off state in the first period, the third switch is turned to the off state and the fifth switch is turned to the on state in the second period subsequent to the first period, the fourth switch is turned to the on state in the third period subsequent to the second period, and the fourth switch is turned to the off state in the fourth period subsequent to the third period, and the third value is determined on the basis of the pixel voltage in the second period and the pixel voltage in the fourth period. This makes it possible to enhance image quality of a captured image. It is to be noted that the effects described here are not necessarily limitative, but may be any of effects described in the present disclosure.

BRIEF DESCRIPTION OF DRAWINGS

FIG. 1 is a configuration diagram illustrating a configuration example of an imaging apparatus according to an embodiment of the present disclosure.

FIG. 2 is a block diagram illustrating a configuration example of a readout section illustrated in FIG. 1.

FIG. 3 is a timing waveform diagram illustrating an operation example of the imaging apparatus illustrated in FIG. 1.

FIG. 4A is another timing waveform diagram illustrating the operation example of the imaging apparatus illustrated in FIG. 1.

FIG. 4B is another timing waveform diagram illustrating the operation example of the imaging apparatus illustrated in FIG. 1.

FIG. 5A is a circuit diagram illustrating an operating state of an imaging pixel illustrated in FIG. 1.

FIG. 5B is a circuit diagram illustrating another operating state of the imaging apparatus illustrated in FIG. 1.

FIG. 5C is a circuit diagram illustrating another operating state of the imaging apparatus illustrated in FIG. 1.

FIG. 6 is an explanatory diagram illustrating an operation example of the imaging apparatus illustrated in FIG. 1.

FIG. 7 is a characteristic diagram illustrating a characteristic example of the imaging apparatus illustrated in FIG. 1.

FIG. 8 is a timing waveform diagram illustrating an operation example of an imaging apparatus according to a comparative example.

FIG. 9A is another timing waveform diagram illustrating the operation example of the imaging apparatus according to the comparative example.

FIG. 9B is another timing waveform diagram illustrating the operation example of the imaging apparatus according to the comparative example.

FIG. 10 is an explanatory diagram illustrating an operation example of the imaging apparatus according to the comparative example.

FIG. 11 is a characteristic diagram illustrating a characteristic example of the imaging apparatus according to the comparative example.

FIG. 12 is a timing waveform diagram illustrating an operation example of an imaging apparatus according to a modification example.

FIG. 13 is an explanatory diagram illustrating an operation example of the imaging apparatus according to the modification example.

MODES FOR CARRYING OUT THE INVENTION

An embodiment of the present disclosure will be described in detail below with reference to drawings.

Embodiment

Configuration Example

FIG. 1 illustrates a configuration example of an imaging apparatus (imaging apparatus 1) according to an embodiment. The imaging apparatus 1 is a so-called CMOS image sensor that is manufactured with use of processes of manufacturing a CMOS (Complementary Metal Oxide Semiconductor) integrated circuit. It is to be noted that an imaging method according to an embodiment of the present disclosure is embodied by the present embodiment, and will be therefore described together. The imaging apparatus 1 includes a pixel array 11, a scanner 12, a readout section 20, a signal processor 14, and a controller 15.

The pixel array 11 includes a plurality of imaging pixels 10 arranged in a matrix form. The pixel array 11 includes a plurality of control lines TGLL, a plurality of control lines FDGL, a plurality of control lines RSTL, a plurality of control lines FCGL, a plurality of control lines TGSL, a plurality of control lines SELL, and a plurality of signal lines SGL. The control lines TGLL extend in a horizontal direction (in a lateral direction in FIG. 1), and a signal STGL is applied to the control lines TGLL by the scanner 12. The control lines FDGL extend in the horizontal direction, and a signal SFDG is applied to the control lines FDGL by the scanner 12. The control lines RSTL extend in the horizontal direction, and a signal SRST is applied to the control lines RSTL by the scanner 12. The control lines FCGL extend in the horizontal direction, and a signal SFCG is applied to the control lines FCGL by the scanner 12. The control lines TGSL extend in the horizontal direction, and a signal STGS is applied to the control lines TGSL by the scanner 12. The control lines SELL extend in the horizontal direction, and a signal SSEL is applied to the control lines SELL by the scanner 12. The signal lines SGL extend in a vertical direction (a longitudinal direction in FIG. 1), and is coupled to the readout section 40.

The imaging pixels 10 each includes a photodiode PD1, a transistor TGL, a photodiode PD2, a transistor TGS, a capacitor FC, transistors FCG, RST, and FDG, a floating diffusion FD, and transistors AMP and SEL. The transistors TGL, TGS, FCG, RST, FDG, AMP, and SEL are N-type MOS transistors in this example.

The photodiode PD1 is a photoelectric converter that generates and accumulates electric charges in an amount corresponding to an amount of received light. A light reception region where the photodiode PD1 is able to receive light is wider than a light reception region where the photodiode PD2 is able to receive light. The photodiode PD1 has an anode grounded, and a cathode coupled to a source of the transistor TGL.

The transistor TGL has a gate coupled to the control line TGLL, the source coupled to the cathode of the photodiode PD1, and a drain coupled to the floating diffusion FD.

The photodiode PD2 is a photoelectric converter that generates and accumulates electric charges in an amount corresponding to the amount of received light. The light reception region where the photodiode PD2 is able to receive light is narrower than the light reception region where the photodiode PD1 is able to receive light. The photodiode PD1 has an anode grounded, and a cathode coupled to a source of the transistor TGS.

The transistor TGS has a gate coupled to the control line TGSL, the source coupled to the cathode of the photodiode PD2, and a drain coupled to one end of the capacitor FC and a source of the transistor FCG.

The capacitor FC has the one end coupled to the drain of the transistor TGS and the source of the transistor FCG, and another end supplied with a power source voltage VDD.

The transistor FCG has a gate coupled to the control line FCGL, the source coupled to the one end of the capacitor FC and the drain of the transistor TGS, and a drain coupled to a source of the transistor RST and a drain of the transistor FDG.

The transistor RST has a gate coupled to the control line RSTL, a drain supplied with the power source voltage VDD, and the source coupled to the drains of the transistors FCG and FDG.

The transistor FDG has a gate coupled to the control line FDGL, the drain coupled to the source of the transistor RST and the drain of the transistor FCG, and a source coupled to the floating diffusion.

The floating diffusion FD accumulates electric charges supplied from the photodiodes PD1 and PD2, and is configured by using, for example, a diffusion layer formed on a surface of a semiconductor substrate. FIG. 1 illustrates the floating diffusion FD with use of a symbol of a capacitor.

The transistor AMP has a gate coupled to the floating diffusion FD, a drain supplied with the power source voltage VDD, and a source coupled to a drain of the transistor SEL.

The transistor SEL has a gate coupled to the control line SELL, the drain coupled to the source of the transistor AMP, and a source coupled to the signal line SGL.

With this configuration, in the imaging pixel 10, the transistor SEL is turned to an on state on the basis of the signal SSEL applied to the control line SELL, thereby causing the imaging pixel 10 to be electrically coupled to the signal line SGL. Accordingly, the transistor AMP is coupled to a current source 23 (to be described later) of the readout section 20, and operates as a so-called source follower. Then, the imaging pixel 10 outputs, as a signal SIG, a pixel voltage VP corresponding to a voltage in the floating diffusion FD to the signal line SGL. Specifically, the imaging pixel 10 sequentially outputs seven pixel voltages VP (VP1 to VP7) in seven periods (conversion periods P1 to P7) within a so-called horizontal period H, as will be described later.

The scanner 12 sequentially drives the plurality of imaging pixels 10 in units of a single row of the imaging pixels 10 on the basis of an instruction from the controller 15, and is configured by using, for example, a shift register. It is to be noted that this is not limitative, and, for example, an address decoder may be used instead. The scanner 12 applies the signal STGL to the plurality of control lines TGLL, applies the signal SFDG to the plurality of control lines FDGL, applies the signal SRST to the plurality of control lines RSTL, applies the signal SFCG to the plurality of control lines FCGL, applies the signal STGS to the plurality of control lines TGSL, and applies the signal SSEL to the plurality of control lines SELL, thereby driving the imaging pixel 10 in one row.

The readout section 20 performs AD (Analog to Digital) conversion on the basis of the signal SIG supplied from the pixel array 11 through the signal line SGL to generate a digital value (count value CNT).

FIG. 2 illustrates a configuration example of the readout section 20. It is to be noted that FIG. 2 also illustrates the controller 15 and the signal processor 14 in addition to the readout section 20.

The readout section 20 includes a readout controller 28, a reference signal generator 29, and a plurality of AD (Analog to Digital) converters ADC.

The readout controller 28 controls a readout operation in the readout section 40 on the basis of an instruction from the controller 15. Specifically, the readout controller 28 supplies a control signal to the reference signal generator 29, thereby causing the reference signal generator 29 to generate a reference signal REF (to be described later). In addition, the readout controller 28 supplies a clock signal CLK and a control signal CC to the plurality of AD converters ADC, thereby controlling an A/D converting operation in the plurality of AD converters ADC.

The reference signal generator 29 generates the reference signal REF on the basis of an instruction from the readout controller 28. As will be described later, the reference signal REF has a so-called ramp waveform in which a voltage level gradually decreases with a lapse of time in seven periods (conversion periods P1 to P7).

The AD converters ADC each perform AD conversion on the basis of the signal SIG supplied from the pixel array 11 through the signal line SGL to convert the pixel voltage VP into a digital value (count value CNT). The plurality of AD converters ADC is provided corresponding to the plurality of signal lines SGL of the pixel array 11.

The AD converters ADC each have capacitors 21 and 22, a current source 23, a comparator 24, and a counter 25. The capacitor 21 has one end supplied with the reference signal REF and another end coupled to a positive input terminal of the comparator 24. The capacitor 22 has one end coupled to the signal line SGL and another end coupled to a negative input terminal of the comparator 24. The current source 23 allows a current having a predetermined current value to flow from the signal line SGL to a ground. The comparator 24 has the positive input terminal supplied with the reference signal REF through the capacitor 21 and the negative input terminal supplied with the signal SIG through the capacitor 22. Then, the comparator 24 compares an input voltage at the positive input terminal with an input voltage at the negative input terminal, and outputs a result of such comparison as a signal CMP. The counter 25 performs a counting operation on the basis of the signal CMP, the clock signal CLK and the control signal CC. Specifically, the readout controller 28 starts generation of the clock signal CLK, thereby causing the counter 25 to start a clock pulse counting operation in the clock signal CLK and increment the count value CNT. Then, the counter 25 terminates the counting operation on the basis of the signal CMP supplied from the comparator 24. In addition, the counter 25 resets the count value CNT on the basis of the control signal CC.

With this configuration, in the readout section 20, the AD converters ADC each perform AD conversion on the basis of the signal SIG, and output the count value CNT. Specifically, the AD converters ADC each perform AD conversion on the basis of seven pixel voltages VP1 to VP7 included in the signal SIG in seven conversion periods P1 to P7, and output seven count values CNT (count values CNT1 to CNT7).

The signal processor 14 performs predetermined signal processing on the basis of the count values CNT supplied from the readout section 20, and outputs a result of the signal processing as an image signal DATA. Specifically, the signal processor 14 generates four images PIC (images PIC1, PIC2, PIC3, and PIC4) on the basis of the seven count values CNT1 to CNT7 supplied from the readout section 20. Then, the signal processor 14 synthesizes the four images PIC to generate one captured image PICA. The signal processor 14 then outputs this captured image PICA as the image signal DATA. Thus, in the imaging apparatus 1, it is possible to expand a dynamic range, as will be described later.

The controller 15 supplies control signals to the scanner 12, the readout section 20, and the signal processor 14 and controls operations of these circuits, thereby controlling an operation of the imaging apparatus 1.

Here, the photodiode PD1 corresponds to a specific example of a "first light-receiving device" in the present disclosure. The photodiode PD2 corresponds to a specific example of a "second light-receiving device" in the present disclosure. The floating diffusion FD corresponds to a specific example of a "first charge accumulation section" in the present disclosure. The capacitor FC corresponds to a specific example of a "second charge accumulation section" in the present disclosure. The transistor TGL corresponds to a specific example of a "first switch" in the present disclosure. The transistor FDG corresponds to a specific example of a "second switch" in the present disclosure. The transistor RST corresponds to a specific example of a "third switch" in the present disclosure. The transistor TGS corresponds to a specific example of a "fourth switch" in the present disclosure. The transistor FCG corresponds to a specific example of a "fifth switch" in the present disclosure. The transistors AMP and SEL correspond to specific examples of an "output section" in the present disclosure. The scanner 12 corresponds to a specific example of a "driving section" in the present disclosure. The readout section 20 and the signal processor 14 correspond to specific examples of a "processor" in the present disclosure.

[Operation and Workings]

Next, operation and workings of the imaging apparatus 1 according to the present embodiment will be described.

(Overview of Overall Operation)

First, an overview of an entire operation of the imaging apparatus 1 will be described with reference to FIGS. 1 and 2. The scanner 12 sequentially drives the plurality of imaging pixels 10 in units of a single row of the imaging pixels 10. The imaging pixels 10 sequentially output seven pixel voltages VP1 to VP7 in seven conversion periods P1 to P7 in the horizontal period H. The AD converters ADC of the readout section 20 perform AD conversion on the basis of these seven pixel voltages VP1 to VP7, output respective seven count values CNT1 to CNT7. The signal processor 14 generate four images PIC (images PIC1, PIC2, PIC3, and PIC4) on the basis of seven count values CNT1 to CNT7 supplied from the readout section 20. Then, the signal processor 14 synthesizes the four images PIC to generate one captured image PICA.

(Detailed Operation)

In the imaging apparatus 1, the plurality of imaging pixels 10 outputs the pixel voltage VP as the signal SIG. The AD converters ADC of the readout section 20 then generate a digital value (count value CNT) on the basis of this signal SIG. An operation of a certain imaging pixel 10A of interest will be described in detail below.

FIGS. 3, 4A, and 4B illustrate an operation example of the imaging apparatus 1, where (A) indicates a waveform of a horizontal synchronization signal HSYNC, (B) indicates a waveform of the signal SSEL to be supplied to the imaging pixel 10A, (C) indicates a waveform of the signal SFDG to be supplied to the imaging pixel 10A, (D) indicates a waveform of the signal STGL to be supplied to the imaging pixel 10A, (E) indicates a waveform of the signal SRST to be supplied to the imaging pixel 10A, (F) indicates a waveform of the signal SFCG to be supplied to the imaging pixel 10A, (G) indicates a waveform of the signal STGS to be supplied to the imaging pixel 10A, (H) indicates a waveform of the reference signal REF, (I) indicates a waveform of the signal SIG to be outputted from the imaging pixel 10A, and (J) indicates an operation of the counter 25 in the AD converter ADC coupled to the imaging pixel 10A. FIG. 4A illustrates the first half of an operation illustrated in FIG. 3, and FIG. 4B illustrates the second half of the operation illustrated in FIG. 3. In (H) and (I) of FIG. 3, (H) and (I) of FIG. 4A, and (H) and (I) of FIG. 4B, the waveforms of the respective signals are plotted on the same voltage axis. In addition, in (J) of FIG. 3, (J) of FIG. 4A, and (J) of FIG. 4B, oblique lines indicate that the counter 25 is performing the counting operation.

FIGS. 5A, 5B, and 5C illustrate a state of the imaging pixel 10A. In this FIGS. 5A, 5B, and 5C, the transistors TGL, RST, FDG, TGS, FCG, and SEL are illustrated with use of switches corresponding to operation states of the transistors.

In the imaging apparatus 1, in a certain horizontal period H, first, the scanner 12 selects one row of the imaging pixels 10 including the imaging pixel 10A of interest from the plurality of imaging pixels 10 in the pixel array 11 with use of the signal SSEL, and electrically couples the imaging pixels 10A to the signal lines SGL corresponding to the imaging pixels 10A. The scanner 12 then controls operations of the imaging pixels 10A with use of the signals SFDG, STGL, SRST, SFCG, and STGS, and the imaging pixels 10A sequentially output seven pixel voltages VP1 to VP7 in seven conversion periods P1 to P7. Then, the AD converters ADC of the readout section 20 perform AD conversion on the basis of these seven pixel voltages VP1 to VP7, and outputs seven count values CNT1 to CNT7. This operation will be described in detail below.

First, the horizontal period H starts at a timing t1, and then the scanner 12 changes a voltage of the signal SSEL from a low level to a high level at a timing t2 ((B) of FIG. 4A). This causes the transistor SEL in the imaging pixel 10A to be turned to the on state, thereby electrically coupling the imaging pixel 10A to the signal line SGL.

(Operation from Timing t11 to Timing t16)

Next, at a timing t11, the scanner 12 changes a voltage of the signal SFDG from the low level to the high level, and changes a voltage of the signal SRST from the low level to the high level ((C) and (E) of FIG. 4A). Accordingly, in the imaging pixel 10A, both the transistors FDG and RST are turned to the on state, a voltage of the floating diffusion FD is set to the power source voltage VDD, and the floating diffusion FD is reset. In addition, at this timing t11, the reference signal generator 29 changes a voltage of the reference signal REF to a voltage V1 ((H) of FIG. 4A).

Next, at a timing t12, the scanner 12 changes the voltage of the signal SFDG from the high level to the low level, and changes the voltage of the signal SRST from the high level to the low level ((C) and (E) of FIG. 4A). This causes both the transistors FDG and RST in the imaging pixel 10A to be turned to an off state.

Next, at a timing t13, the scanner 12 changes the voltage of the signal SFDG from the low level to the high level ((C) of FIG. 4A). This causes the transistor FDG to be turned to the on state.

Thus, in the imaging pixel 10A, as illustrated in FIG. 5A, the transistors FDG and SEL are turned to the on state, and all other transistors are turned to the off state. The transistor FDG is in the on state, which causes the floating diffusion FD and the transistor FDG to configure a combined capacitance. This combined capacitance functions as a conversion capacitance that converts an electric charge into a voltage in the imaging pixel 10A. In the imaging pixel 10A, the transistor FDG is in the on state as described above; therefore, the conversion capacitance of the imaging pixel 10A has a large capacitance value. Accordingly, conversion efficiency of electric charges to voltages is low. This conversion capacitance holds electric charges in a case where the floating diffusion FD is reset in a period from the timing t11 to the timing t12. The imaging pixel 10A outputs the pixel voltage VP (pixel voltage VP1) corresponding to the voltage in the floating diffusion FD.

Next, in a period (conversion period P1) from a timing t14 to a timing t16, the AD converter ADC performs AD conversion on the basis of the pixel voltage VP1. Specifically, at the timing t14, the readout controller 28 starts generation of the clock signal CLK. Simultaneously with this, the reference signal generator 29 starts decreasing the voltage of the reference signal REF from the voltage V1 by a predetermined degree of change ((H) of FIG. 4A). Accordingly, the counter 25 of the AD converter ADC starts the counting operation ((J) of FIG. 4A).

Thereafter, at the timing t15, the voltage of the reference signal REF falls below the voltage (pixel voltage VP1) of the signal SIG ((H) and (I) of FIG. 4A). Accordingly, the comparator 24 of the AD converter ADC changes the voltage of the signal CMP. As a result, the counter 25 stops the counting operation ((J) of FIG. 4A). The count value CNT of the counter 25 at this time is the count value CNT1. From then on, the readout section 20 supplies this count value CNT1 to the signal processor 14, and thereafter resets the count value CNT of the counter 25.

Then, at the timing t16, the readout controller 28 stops the generation of the clock signal CLK with the end of the conversion period P1, and the reference signal generator 29 stops change of the voltage of the reference signal REF ((H) of FIG. 4A).

(Operation from Timing t21 to Timing t24)

Next, at a timing t21, the scanner 12 changes the voltage of the signal SFDG from the high level to the low level ((C) of FIG. 4A). This causes the transistor FDG in the imaging pixel 10A to be turned to the off state. In addition, at this timing t21, the reference signal generator 29 changes the voltage of the reference signal REF to the voltage V1 ((H) of FIG. 4A).

Thus, in the imaging pixel 10A, as illustrated in FIG. 5B, the transistor SEL is turned to the on state, and all other transistors are turned to the off state. In the imaging pixel 10A, the transistor FDG is in the off state as described above; therefore, the conversion capacitance of the imaging pixel 10A has a small capacitance value. Accordingly, conversion efficiency of electric charges to voltages is high. This conversion capacitance holds electric charges in a case where the floating diffusion FD is reset in the period from the timing t11 to the timing t12. The imaging pixel 10A outputs the pixel voltage VP (pixel voltage VP2) corresponding to the voltage in the floating diffusion FD.

Next, in a period (conversion period P2) from a timing t22 to a timing t24, the AD converter ADC performs AD conversion on the basis of the pixel voltage VP2. This operation is similar to the operation in the conversion period P1. The AD converter ADC performs AD conversion on the basis of the pixel voltage VP2 to obtain the count value CNT2 ((J) of FIG. 4A). From then on, the readout section 20 supplies this count value CNT2 to the signal processor 14, and thereafter resets the count value CNT of the counter 25.

(Operation from Timing t31 to Timing t35)

Next, at a timing t31, the scanner 12 changes the voltage of the signal STGL from the low level to the high level ((D) of FIG. 4A). This causes the transistor TGL in the imaging pixel 10A to be turned the on state. Accordingly, electric charges generated in the photodiode PD1 are transferred to the floating diffusion FD. In addition, at this timing t31, the reference signal generator 29 changes the voltage of the reference signal REF to the voltage V1 ((H) of FIG. 4A).

Next, at the timing t32, the scanner 12 changes the voltage of the signal STGL from the high level to the low level ((D) of FIG. 4A). This causes the transistor TGL in the imaging pixel 10A to be turned to the off state.

Thus, in the imaging pixel 10A, as illustrated in FIG. 5B, the transistor FDG is in the off state; therefore, the conversion capacitance in the imaging pixel 10A has a small capacitance value. Accordingly, conversion efficiency of electric charges to voltages is high. This conversion capacitance holds electric charges transferred from the photodiode PD1 in a period from the timing t31 to the timing t32. The imaging pixel 10A outputs the pixel voltage VP (pixel voltage VP3) corresponding to the voltage in the floating diffusion FD.

Next, in a period (conversion period P3) from a timing t33 to a timing t35, the AD converter ADC performs AD conversion on the basis of the pixel voltage VP3. This operation is similar to the operation in the conversion period P1. The AD converter ADC performs AD conversion on the basis of the pixel voltage VP3 to obtain the count value CNT3 ((J) of FIG. 4A). This count value CNT3 corresponds to the count value CNT2 similarly obtained in a case where the conversion efficiency is high (in the conversion period P2). From then on, the readout section 20 supplies this count value CNT3 to the signal processor 14, and thereafter resets the count value CNT of the counter 25.

(Operation from Timing t41 to Timing t44)

Next, at a timing t41, the scanner 12 changes the voltage of the signal SFDG from the low level to the high level ((C) of FIG. 4A). This causes the transistor FDG in the imaging pixel 10A to be turned to the on state. In addition, at this timing t41, the reference signal generator 29 changes the voltage of the reference signal REF to the voltage V1 ((H) of FIG. 4A).

Thus, in the imaging pixel 10A, as illustrated in FIG. 5A, the transistor FDG is in the on state, which causes the floating diffusion FD and the transistor FDG to configure a combined capacitance (conversion capacitance). Accordingly, the conversion capacitance of the imaging pixel 10A has a large capacitance value; therefore, conversion efficiency of electric charges to voltages is low. The conversion capacitance holds electric charges transferred from the photodiode PD1 in a period from the timing t31 to the timing t32. The imaging pixel 10A outputs the pixel voltage VP (pixel voltage VP4) corresponding to the voltage in the floating diffusion FD.

Next, in a period (conversion period P4) from a timing t42 to a timing t44, the AD converter ADC performs AD conversion on the basis of the pixel voltage VP4. This operation is similar to the operation in the conversion period P1. The AD converter ADC performs AD conversion on the basis of the pixel voltage VP4 to obtain the count value CNT4 ((J) of FIG. 4A). This count value CNT4 corresponds to the count value CNT1 obtained in the case where conversion efficiency is similarly low (in the conversion period P1). From then on, the readout section 20 supplies this count value CNT4 to the signal processor 14, and thereafter resets the count value CNT of the counter 25.

(Operation from Timing t51 to Timing t56)

Next, at a timing t51, the scanner 12 changes the voltage of the signal SRST from the low level to the high level ((E) of FIG. 4B). This causes the transistor RST in the imaging pixel 10A to be turned to the on state. The transistor FDG is in the state, which causes the floating diffusion FD to be set to the power source voltage VDD, and causes the floating diffusion FD to be reset. In addition, at this timing t51, the reference signal generator 29 changes the voltage of the reference signal REF to the voltage V1 ((H) of FIG. 4B).

Next, at the timing t52, the scanner 12 changes the voltage of the signal SRST from the high level to the low level ((E)

of FIG. 4B). This causes the transistor RST in the imaging pixel 10A to be turned to the off state.

Next, at the timing t53, the scanner 12 changes the voltage of the signal SFCG from the low level to the high level ((F) of FIG. 4B). This causes the transistor FCG in the imaging pixel 10A to be turned to the on state.

Thus, in the imaging pixel 10A, as illustrated in FIG. 5C, the transistors FDG, FCG, and SEL are turned to the on state, and all other transistors are turned to the off state. Both the transistors FDG and FCG are in the on state, which causes the floating diffusion FD, the transistors FDG and FCG, and the capacitor FC to configure a combined capacitance (conversion capacitance). This conversion capacitance holds electric charges generated in the photodiode PD2 before the timing t53 and accumulated in the capacitor FC through the transistor TGS. The imaging pixel 10A outputs the pixel voltage VP (pixel voltage VP5) corresponding to the voltage in the floating diffusion FD.

Next, in a period (conversion period P5) from a timing t54 to a timing t56, the AD converter ADC performs AD conversion on the basis of this pixel voltage VP5. This operation is similar to the operation in the conversion period P1. The AD converter ADC performs AD conversion on the basis of the pixel voltage VP5 to obtain the count value CNT5 ((J) of FIG. 4B). From then on, the readout section 20 supplies this count value CNT5 to the signal processor 14, and thereafter resets the count value CNT of the counter 25.

(Operation from Timing t61 to Timing t65)

Next, at a timing t61, the scanner 12 changes the voltage of the signal STGS from the low level to the high level ((G) of FIG. 4B). This causes the transistor TGS in the imaging pixel 10A to be turned to the on state. In addition, at this timing t61, the reference signal generator 29 changes the voltage of the reference signal REF to the voltage V1 ((H) of FIG. 4B).

Next, at a timing t62, the scanner 12 changes the voltage of the signal STGS from the high level to the low level ((G) of FIG. 4B). This causes the transistor TGS in the imaging pixel 10A to be turned to the off state.

Thus, in the imaging pixel 10A, as illustrated in FIG. 5C, both the transistors FDG and FCG are in the on state, which causes the floating diffusion FD, the transistor FDG and FCG, and the capacitor FC to configure a combined capacitance (conversion capacitance). This conversion capacitance holds electric charges transferred from the photodiode PD2 in a period from the timing t61 to the timing t62 in addition to the electric charges generated in the photodiode PD2 before the timing t53 and accumulated in the capacitor FC through the transistor TGS. The imaging pixel 10A outputs the pixel voltage VP (pixel voltage VP6) corresponding to the voltage in the floating diffusion FD.

Next, in a period (conversion period P6) from a timing t63 to a timing t65, the AD converter ADC performs AD conversion on the basis of the pixel voltage VP6. This operation is similar to the operation in the conversion period P1. The AD converter ADC performs AD conversion on the basis of the pixel voltage VP6 to obtain the count value CNT6 ((J) of FIG. 4B). This count value CNT6 corresponds to the count value CNT5 obtained in a case where the floating diffusion FD, the transistors FDG and FCG, and the capacitor FC configure the combined capacitance. From then on, the readout section 20 supplies this count value CNT6 to the signal processor 14, and thereafter resets the count value CNT of the counter 25.

(Operation from Timing t71 to Timing t77)

Next, at a timing t71, the scanner 12 changes the voltage of the signal SRST from the low level to the high level ((E) of FIG. 4B). This causes the transistor RST in the imaging pixel 10A to be turned to the on state. The transistors FDG and FCG are in the on state, which causes the voltage of the floating diffusion FD and the voltage of the capacitor FC to be set to the power source voltage VDD, and causes the floating diffusion FD and the capacitor FC to be reset. In addition, at this timing t71, the reference signal generator 29 changes the voltage of the reference signal REF to the voltage V1 ((H) of FIG. 4B).

Next, at a timing t72, the scanner 12 changes the voltage of the signal SFCG from the high level to the low level ((F) of FIG. 4B). This causes the transistor FCG in the imaging pixel 10A to be turned to the off state.

Next, at a timing t73, the scanner 12 changes the voltage of the signal SRST from the high level to the low level ((E) of FIG. 4B). This causes the transistor RST in the imaging pixel 10A to be turned to the off state.

Next, at a timing t74, the scanner 12 changes the voltage of the signal SFCG from the low level to the high level ((F) of FIG. 4B). This causes the transistor FCG in the imaging pixel 10A to be turned to the on state.

Thus, in the imaging pixel 10A, as illustrated in FIG. 5C, both the transistors FDG and FCG are in the on state, which causes the floating diffusion FD, the transistors FDG and FCG, and the capacitor FC to configure a combined capacitance (conversion capacitance). This conversion capacitance holds electric charges in a case where the floating diffusion FD and the capacitor FC are reset in a period from the timing t71 to the timing t72. The imaging pixel 10A outputs the pixel voltage VP (pixel voltage VP7) corresponding to the voltage in the floating diffusion FD.

Next, in a period (conversion period P7) from a timing t75 to a timing t77, the AD converter ADC performs AD conversion on the basis of the pixel voltage VP7. This operation is similar to the operation in the conversion period P1. The AD converter ADC performs AD conversion on the basis of the pixel voltage VP7 to obtain the count value CNT7 ((J) of FIG. 4B). This count value CNT7 corresponds to the count value CNT5 obtained in a case where the floating diffusion FD, the transistors FDG and FCG, and the capacitor FC configure the combined capacitance. From then on, the readout section 20 supplies this count value CNT7 to the signal processor 14, and thereafter resets the count value CNT of the counter 25.

Next, at a timing t7, the scanner 12 changes the voltage of the signal SFDG from the high level to the low level, and changes the voltage of the signal SFCG from the high level to the low level ((C) and (F) of FIG. 4B). This causes the transistors FDG and FCG in the imaging pixel 10A to be turned to the off state. In addition, at this timing t7, the reference signal generator 29 changes the voltage of the reference signal REF to the voltage V2 ((H) of FIG. 4B).

Then, at a timing t8, the scanner 12 changes the voltage of the signal SSEL from the high level to the low level ((B) of FIG. 4B). Accordingly, in the imaging pixel 10A, the transistor SEL is turned to the off state, and the imaging pixel 10A is electrically separated from the signal line SGL.

Next, an operation of the signal processor 14 will be described. The signal processor 14 generates four images PIC (image PIC1, PIC2, PIC3, and PIC4) on the basis of the count values CNT supplied from the readout section 20. Then, the signal processor 14 synthesizes the four images PIC to generate one captured image PICA.

FIG. 6 schematically illustrates the operation of the signal processor 14. Waveforms illustrated in (A) to (G) of FIG. 6 are similar to the waveforms illustrated in (A) to (G) of FIG. 3.

As described with reference to FIGS. 3, 4A, and 4B, the readout section 20 generates the count value CNT1 on the basis of the operation in the period from the timing t11 to the timing t21, generates the count value CNT2 on the basis of the operation in the period from the timing t21 to the timing t31, generates the count value CNT3 on the basis of the operation in the period from the timing t31 to the timing t41, generates the count value CNT4 on the basis of the operation in the period from the timing t41 to the timing t51, generates the count value CNT5 on the basis of the operation in the period from the timing t51 to the timing t61, generates the count value CNT6 on the basis of the operation in the period from the timing t61 to the timing t71, and generates the count value CNT7 on the basis of the operation in the period from the timing t71 to the timing t7.

The signal processor 14 generates a pixel value VAL1 on the basis of the count value CNT2 and the count value CNT3. Specifically, the signal processor 14 calculates the pixel value VAL1 by subtracting the count value CNT2 from the count value CNT3 (CNT3−CNT2). That is, the imaging apparatus 1 uses the principle of so-called correlated double sampling (CDS; Correlated double sampling) to calculate the pixel value VAL1 with use of the count value CNT2 corresponding to P-phase (Pre-Charge phase) data and the count value CNT3 corresponding to D-phase (Data phase) data.

Similarly, the signal processor 14 generates a pixel value VAL2 on the basis of the count value CNT1 and the count value CNT4. Specifically, the signal processor 14 calculates the pixel value VAL2 by subtracting the count value CNT1 from the count value CNT4 (CNT4−CNT1). That is, the imaging apparatus 1 uses the principle of correlated double sampling to calculate the pixel value VAL2 with use of the count value CNT1 corresponding to the P-phase data and the count value CNT4 corresponding to the D-phase data.

Similarly, the signal processor 14 generates a pixel value VAL3 on the basis of the count value CNT5 and the count value CNT6. Specifically, the signal processor 14 calculates the pixel value VAL3 by subtracting the count value CNT5 from the count value CNT6 (CNT6−CNT5). That is, the imaging apparatus 1 uses the principle of correlated double sampling to calculate the pixel value VAL3 with use of the count value CNT5 corresponding to the P-phase data and the count value CNT6 corresponding to the D-phase data.

The signal processor 14 then generates a pixel value VAL4 on the basis of the count value CNT5 and the count value CNT7. Specifically, the signal processor 14 calculates the pixel value VAL4 by subtracting the count value CNT7 from the count value CNT5 (CNT5−CNT7). That is, the imaging apparatus 1 uses the principle of so-called double data sampling (DDS; Double Data Sampling) to calculate the pixel value VAL4 with use of the count value CNT7 after resetting the floating diffusion FD and the capacitor FC and the count value CNT5 after resetting the floating diffusion FD.

Here, the pixel value VAL1 corresponds to a specific example of a "first value" in the present disclosure. The pixel value VAL2 corresponds to a specific example of a "second value" in the present disclosure. The pixel value VAL3 corresponds to a specific example of a "third value" in the present disclosure. The pixel value VAL4 corresponds to a specific example of a "fourth value" in the present disclosure.

The signal processor 14 then generates the image PIC1 on the basis of the pixel values VAL1 in all of the imaging pixels 10 in the pixel array 11, generates the image PIC2 on the basis of the pixel values VAL2 in all of the imaging pixels 10 in the pixel array 11, generates the image PIC3 on the basis of the pixel values VAL3 in all of the imaging pixels 10 in the pixel array 11, and generates the image PIC4 on the basis of the pixel values VAL4 in all of the imaging pixels 10 in the pixel array 11. Then, the signal processor 14 synthesizes these images PIC1 to PIC4 to generate the captured image PICA.

FIG. 7 illustrates an example of a signal-to-noise ratio (S/N ratio) in the captured image PICA synthesized by the imaging apparatus 1. In FIG. 7, a horizontal axis indicates luminance, and a vertical axis indicates the S/N ratio.

In a case where four images PIC1 to PIC4 are synthesized, the signal processor 14 increases the number of images PIC to be used out of the images PIC1 to PIC4 with an increase in luminance. Specifically, in a case where luminance at a pixel of interest is lower than a luminance value L1, the signal processor 14 generates a pixel value at the pixel of interest in the captured image PICA on the basis of the pixel value VAL1 at the pixel of interest in the image PIC1. In addition, in a case where the luminance at the pixel of interest is higher than the luminance value L1 and lower than a luminance value L2, the signal processor 14 generates a pixel value at the pixel of interest in the captured image PICA on the basis of the pixel values VAL1 and VAL2 at the pixel of interest in two images PIC1 and PIC2. In addition, in a case where the luminance at the pixel of interest is higher than the luminance value L2 and lower than a luminance value L3, the signal processor 14 generates a pixel value at the pixel of interest in the captured image PICA on the basis of the pixel values VAL1 to VAL3 at the pixel of interest in three images PIC1 to PIC3. In addition, in a case where the luminance is higher than the luminance value L3, the signal processor 14 generates a pixel value at the pixel of interest in the captured image PICA on the basis of the pixel values VAL1 to VAL4 at the pixel of interest in four images PIC1 to PIC4.

As illustrated in FIG. 7, the S/N ratio decreases in a case where the luminance exceeds the luminance value L2 (portion W1), and further decreases in a case where the luminance exceeds the luminance value L3 (portion W3). That is, in the portion W1, the S/N ratio is decreased by adding the image PIC3 to images to be used for synthesis, and in the portion W2, the S/N ratio is decreased by adding the image PIC4 to the images to be used for synthesis.

As described above, in the imaging apparatus 1, the pixel value VAL3 included in the image PIC3 is determined by correlated double sampling. This makes it possible to reduce noise included in the image PIC3 in the imaging apparatus 1; therefore, as will be described below in comparison with a comparative example, it is possible to suppress a decrease in the S/N ratio in the luminance value L2 illustrated in FIG. 7.

Comparative Example

Next, effects of the imaging apparatus 1 according to the present embodiment will be described in comparison with an imaging apparatus 1R according to a comparative example. The imaging apparatus 1R includes a scanner 12R, a readout section 20R, a signal processor 14R, and a controller 15R. In this imaging apparatus 1R, the imaging pixels 10 sequentially output six pixel voltages VP1 to VP4, VP16, and VP7 in six conversion periods P1 to P6 in the horizon period H. The AD converters ADC of the readout section 20R each perform AD conversion on the basis of these six pixel voltages VP1 to VP4, VP16, and VP7, and output six count values CNT1 to CNT4, CNT16, and CNT7. The signal processor 14R generates three images PIC (image PIC1, PIC2, and PIC13) on the basis of the count values CNT1 to CNT4, CNT16, and CNT7 supplied from the readout section 20R. The signal processor 14R then synthesizes the three images PIC to generate one captured image PICR.

FIGS. 8, 9A, and 9B illustrate an operation example of a certain imaging pixel 10A of interest in the imaging apparatus 1R. FIG. 9A illustrates the first half of an operation illustrated in FIG. 8, and FIG. 9B illustrates the second half of the operation illustrated in FIG. 8. The operation until the timing t51 and the operation from the timing t71 are similar to the operation of the imaging apparatus 1 according to the present embodiment (FIGS. 3, 4A, and 4B). The operation from the timing t51 to the timing t71 will be described below.

At the timing t51, the scanner 12R changes the voltage of the signal SRST from the low level to the high level ((E) of FIG. 9B). This causes the transistor RST in the imaging pixel 10A to be turned to the on state. The transistor FDG is in the on state, which causes the floating diffusion FD to be set to the power source voltage VDD, and causes the floating diffusion FD to be reset. In addition, at this timing t51, the reference signal generator 29 changes the voltage of the reference signal REF to the voltage V1 ((H) of FIG. 9B).

Next, at the timing t52, the scanner 12R changes the voltage of the signal SRST from the high level to the low level ((E) of FIG. 9B). This causes the transistor RST in the imaging pixel 10A to be turned to the off state.

Next, at the timing t53, the scanner 12R changes the voltage of the signal SFCG from the low level to the high level ((F) of FIG. 9B). This causes the transistor FCG in the imaging pixel 10A to be turned to the on state.

Next, at the timing t58, the scanner 12R changes the voltage of the signal STGS from the low level to the high level ((G) of FIG. 9B). This causes the transistor TGS in the imaging pixel 10A to be turned to the on state.

Next, at the timing t59, the scanner 12R changes the voltage of the signal STGS from the high level to the low level ((G) of FIG. 8B). This causes the transistor TGS in the imaging pixel 10A to be turned to the off state.

Thus, in the imaging pixel 10A, as illustrated in FIG. 5C, both the transistors FDG and FCG are in the on state, which causes the floating diffusion FD, the transistors FDG and FCG, and the capacitor FC to configure a combined capacitance (conversion capacitance). This conversion capacitance holds electric charges transferred from the photodiode PD2 in a period from the timing t58 to the timing t59 in addition to electric charges generated in the photodiode PD2 before the timing t53 and accumulated in the capacitor FC through the transistor TGS. The imaging pixel 10A outputs the pixel voltage VP (pixel voltage VP16) corresponding to the voltage in the floating diffusion FD.

Next, in a period (conversion period P16) from the timing t63 to the timing t65, the AD converter ADC performs AD conversion on the basis of the pixel voltage VP16. This operation is similar to the operation in the conversion period P1. The AD converter ADC performs AD conversion on the basis of the pixel voltage VP16 to obtain a count value CNT16 ((J) of FIG. 9B). From then on, the readout section 20R supplies this count value CNT16 to the signal processor 14R, and thereafter resets the count value CNT of the counter 25.

FIG. 10 schematically illustrates an operation of the signal processor 14R. Waveforms illustrated in (A) to (G) of FIG. 10 is similar to the waveforms illustrated in (A) to (G) of FIG. 8.

As described with reference to FIGS. 8, 9A, and 9B, the readout section 20R generates the count value CNT16 on the basis of the operation in the period from the timing t51 to the timing t71, and generates the count value CNT7 on the basis of the operation in the period from the timing t71 to the timing t7.

The signal processor 14R generates a pixel value VAL13 on the basis of the count value CNT16 and the count value CNT7. Specifically, the signal processor 14R uses the principle of double data sampling (DDS) to calculate the pixel value VAL13 by subtracting the count value CNT7 from the count value CNT16 (CNT16−CNT7).

The signal processor 14R then generates the image PIC1 on the basis of the pixel values VAL1 in all of the imaging pixels 10 in the pixel array 11, generates the image PIC2 on the basis of the pixel values VAL2 in all of the imaging pixels 10 in the pixel array 11, and generates the image PIC13 on the basis of the pixel values VAL13 in all of the imaging pixels 10 in the pixel array 11. Then, the signal processor 14R synthesizes these images PIC1, PIC2, and PIC13 to generate the captured image PICR.

FIG. 11 illustrates an example of a signal-to-noise ratio (S/N ratio) in the captured image PICR synthesized by the imaging apparatus 1R.

As in the signal processor 14 according to the present embodiment, in a case where three images PIC are synthesized, the signal processor 14R increases the number of images PIC to be used out of the images PIC1, PIC2, and PIC13 with an increase in luminance. Specifically, in a case where luminance at a pixel of interest is lower than a luminance value L11, the signal processor 14R generates a pixel value at the pixel of interest in the captured image PICR on the basis of the pixel value VAL1 at the pixel of interest in the image PIC1. In addition, in a case where the luminance at the pixel of interest is higher than the luminance value L11 and lower than a luminance value L12, the signal processor 14R generates a pixel value at the pixel of interest in the captured image PICR on the basis of the pixel values VAL1 and VAL2 at the pixel of interest in two images PIC1 and PIC2. In addition, in a case where the luminance at the pixel of interest is higher than the luminance value L12, the signal processor 14R generates a pixel value at the pixel of interest in the captured image PICR on the basis of the pixel values VAL1, VAL2, and VAL13 at the pixel of interest in three images PIC1, PIC2, and PIC13.

As illustrated in FIG. 11, the S/N ratio decreases in a case where the luminance exceeds the luminance value L12 (portion W3). That is, in the portion W3, the S/N ratio is decreased by adding the image PIC13 to images to be used for synthesis. That is, this image PIC13 is generated by double data sampling (DDS); therefore, it is not possible to sufficiently remove noise as in correlated double sampling. As a result, in the imaging apparatus 1R, the S/N ratio in the portion W3 is greatly decreased.

In contrast, in the imaging apparatus 1 according to the present embodiment, the image PIC3 is generated by correlated double sampling. That is, in FIG. 6, the signal processor 14 generates the image PIC3 by using, as the P-phase data, the count value CNT5 generated on the basis of the operation in the period from the timing t51 to the timing t61 and using, as the D-phase data, the count value CNT6 generated on the basis of the operation in the period from the timing t61 to the timing t71. This makes it possible to remove, for example, components of dark current and reset noise in the photodiode PD2 in the imaging apparatus 1, which makes it possible to suppress a decrease in the S/N ratio in a case where the image PIC3 is added to images to be used for synthesis, as illustrated in FIG. 7. As a result, in the imaging apparatus 1, it is possible to improve image quality of the captured image PICA.

Effects

As described above, in the present embodiment, the third image PIC3 is generated by correlated double sampling, and the captured image is generated with use of this image PIC3, which makes it possible to improve image quality.

Modification Example 1

In the above-described embodiment, as illustrated in FIG. 3, seven conversion periods P1 to P7 are provided, but this is not limitative. For example, eight conversion periods P1 to P8 may be provided as in an imaging apparatus 1B illustrated in FIGS. 12 and 13. In this imaging apparatus 1B, a period including a conversion period P15 is added between a period from the timing t51 to the timing t61 and a period from the timing t61 to the timing t71 in the imaging apparatus 1 (FIG. 3) according to the above-described embodiment.

In the imaging apparatus 1B, the ADC converter ADC generates the count value CNT (count value CNT5) on the basis of the pixel voltage VP (VP5) outputted from the imaging pixel 10A in the conversion period P5. Then, in the imaging apparatus 1B, the ADC converter ADC thereafter generates the count value CNT (count value CNT15) on the basis of the pixel voltage VP outputted from the imaging pixel 10A in the conversion period P15 while maintaining the signals SSEL, SFDG, STGL, SRST, SFCG, and STGS.

The signal processor 14 then generates the pixel value VAL3 on the basis of the count value CNT15 and the count value CNT6. Specifically, the signal processor 14 calculates the pixel value VAL3 by subtracting the count value CNT15 from the count value CNT6 (CNT6−CNT15). That is, the imaging apparatus 1B uses the principle of correlated double sampling to calculate the pixel value VAL3 with use of the count value CNT15 corresponding to the P-phase data and the count value CNT6 corresponding to the D-phase data. In addition, the signal processor 14 generates the pixel value VAL4 on the basis of the count value CNT5 and the count value CNT7, as in the above-described embodiment.

The signal processor 14 then generates the image PIC1 on the basis of the pixel values VAL1 in all of the imaging pixels 10 in the pixel array 11, generates the image PIC2 on the basis of the pixel values VAL2 in all of the imaging pixels 10 in the pixel array 11, generates the image PIC3 on the basis of the pixel values VAL3 in all of the imaging pixels 10 in the pixel array 11, and generates the image PIC4 on the basis of the pixel values VAL4 in all of the imaging pixels 10 in the pixel array 11. Then, the signal processor 14 synthesizes these images PIC1 to PIC4 to generate the captured image PICA.

Although the present technology has been described above with reference to the embodiment and the modification example, the present technology is not limited to the embodiment, and the like, and may be modified in a variety of ways.

For example, waveforms and transition timings of the signals SSEL, SFDG, STGL, SRST, SFCG, and STGS in the above-described embodiment and the like are examples, and may be changed as appropriate.

It is to be noted that the effects described herein are merely illustrative and are not limitative, and other effects may be provided.

It is to be noted that the present technology may have any of the following configurations.

(1)

An imaging apparatus including:

a first light-receiving device and a second light-receiving device;

a first charge accumulation section and a second charge accumulation section;

a first switch that is turned to an on state to couple the first light-receiving device and the first charge accumulation section to each other;

a second switch that is turned to the on state to couple a predetermined node and the first charge accumulation section to each other;

a third switch that is turned to the on state to apply a predetermined voltage to the predetermined node;

a fourth switch that is turned to the on state to couple the second light-receiving device and the second charge accumulation section to each other;

a fifth switch that is turned to the on state to couple the second charge accumulation section and the predetermined node to each other;

an output section that outputs a pixel voltage corresponding to a voltage in the first charge accumulation section;

a driving section that drives each of the switches; and a processor that determines a first value, a second value, a third value, and a fourth value on the basis of the pixel voltage, and generates a pixel value on the basis of these values, the driving section turning the second switch and the third switch to the on state and turning the first switch, the fourth switch, and the fifth switch to the off state in a first period, the driving section turning the third switch to the off state and turning the fifth switch to the on state in a second period subsequent to the first period, the driving section turning the fourth switch to the on state in a third period subsequent to the second period, the driving section turning the fourth switch to the off state in a fourth period subsequent to the third period, and the processor determining the third value on the basis of the pixel voltage in the second period and the pixel voltage in the fourth period.

(2)

The imaging apparatus according to (1), in which the processor performs AD conversion on the basis of the pixel voltage in the second period to generate a first digital value, performs AD conversion on the basis of the pixel voltage in the fourth period to generate a second digital value, and determines the third value on the basis of the first digital value and the second digital value.

(3)

The imaging apparatus according to (1) or (2), in which the driving section turns the third switch and the fifth switch to the on state in a fifth period subsequent to the fourth period, the driving section turns the third switch and the fifth switch to the off state in a sixth period subsequent to the fifth period, the driving section turns the third switch to the off state and turns the fifth switch to the on state in a seventh period subsequent to the sixth period, and the processor determines the fourth value on the basis of the pixel voltage in the second period and the pixel voltage in the seventh period.

(4)

The imaging apparatus according to (1) or (2), in which the driving section turns the third switch and the fifth switch to the on state in a fifth period subsequent to the fourth period, the driving section turns the third switch and the fifth switch to the off state in a sixth period subsequent to the fifth period, the driving section turns the third switch to the off state and turns the fifth switch to the on state in a seventh period subsequent to the sixth period, the second period includes a first sub-period and a second sub-period subsequent to the first sub-period, the processor determines the third value on the basis of the pixel voltage in the second sub-period of the second period and the pixel voltage in the fourth period, and the processor determines the fourth value on the basis of the pixel voltage in the first sub-period of the second period and the pixel voltage in the seventh period.

(5)

The imaging apparatus according to any one of (1) to (4), in which the driving section turns the second switch and the third switch to the on state, and turns the first switch, the fourth switch, and the fifth switch to the off state in an eighth period, the driving section turns the second switch to the on state and turns the third switch to the off state in a ninth period subsequent to the eighth period, the driving section turns the second switch to the off state in a tenth period subsequent to the ninth period, the driving section turns the first switch to the on state in an eleventh period subsequent to the tenth period, the driving section turns the first switch to the off state in a twelfth period subsequent to the eleventh period, the driving section turns the second switch to the on state in a thirteenth period subsequent to the twelfth period and prior to the first period, the processor determines the first value on the basis of the pixel voltage in the tenth period and the pixel voltage in the twelfth period, and the processor determines the second value on the basis of the pixel voltage in the ninth period and the pixel voltage in the thirteenth period.

(6)

The imaging apparatus according to any one of (1) to (5), in which the processor generates the pixel value on the basis of the first value in a case where luminance is lower than a first luminance value, the processor generates the pixel value on the basis of the first value and the second value in a case where the luminance is higher than the first luminance value and lower than a second luminance value, the processor generates the pixel value on the basis of the first value, the second value, and the third value in a case where the luminance is higher than the second luminance value and lower than a third luminance value, and the processor generates the pixel value on the basis of the first value, the second value, the third value, and the fourth value in a case where the luminance is higher than the third luminance value.

(7)

The imaging apparatus according to any one of (1) to (6), in which a light reception region of the first light-receiving device is wider than a light reception region of the second light-receiving device.

(8)

The imaging apparatus according to any one of (1) to (7), in which the first charge accumulation section includes a diffusion layer.

(9)

The imaging apparatus according to any one of (1) to (8), in which the processor includes:

a reference signal generator that generates a reference signal of which a voltage level varies, a comparing section that compares the pixel voltage with the reference signal to generate a comparison signal, and a counter that performs a counting operation on the basis of the comparison signal to generate a digital value.

(10)

An imaging method including:

driving respective switches of an imaging pixel, the imaging pixel including a first light-receiving device and a second light-receiving device, a first charge accumulation section and a second charge accumulation section, a first switch, a second switch, a third switch, a fourth switch, a fifth switch, and an output section, the first switch that is turned to an on state to couple the first light-receiving device and the first charge accumulation section to each other, the second switch that is turned to the on state to couple a predetermined node and the first charge accumulation section to each other, the third switch that is turned to the on state to apply a predetermined voltage to the predetermined node, the fourth switch that is turned to the on state to couple the second light-receiving device and the second charge accumulation section to each other, the fifth switch that is turned to the on state to couple the second charge accumulation section and the predetermined node to each other, and the output section that outputs a pixel voltage corresponding to a voltage in the first charge accumulation section;

determining a first value, a second value, a third value, and a fourth value on the basis of the pixel voltage, and generating a pixel value on the basis of these values;

turning the second switch and the third switch to the on state and turning the first switch, the fourth switch, and the fifth switch to the off state in a first period;

turning the third switch to the off state and turning the fifth switch to the on state in a second period subsequent to the first period;

turning the fourth switch to the on state in a third period subsequent to the second period;

turning the fourth switch to the off state in a fourth period subsequent to the third period; and determining the third value on the basis of the pixel voltage in the second period and the pixel voltage in the fourth period.

This application claims the benefit of Japanese Priority Patent Application JP2017-208118 filed with the Japan Patent Office on Oct. 27, 2017, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging apparatus, comprising:
a first light-receiving device and a second light-receiving device;
a first charge accumulation section and a second charge accumulation section;

a first switch configured to turn to an on state to couple the first light-receiving device and the first charge accumulation section to each other;
a second switch configured to turn to the on state to couple a predetermined node and the first charge accumulation section to each other;
a third switch configured to turn to the on state to apply a predetermined voltage to the predetermined node;
a fourth switch configured to turn to the on state to couple the second light-receiving device and the second charge accumulation section to each other;
a fifth switch configured to turn to the on state to couple the second charge accumulation section and the predetermined node to each other;
an output section configured to output a pixel voltage corresponding to a voltage in the first charge accumulation section;
a driving section configured to drive each of the first switch, the second switch, the third switch, the fourth switch, and the fifth switch; and
a processor configured to:
determine a first value, a second value, a third value, and a fourth value based on the pixel voltage, and
generate a pixel value based on the first value, the second value, the third value, and the fourth value, wherein
the driving section is further configured to:
turn the second switch and the third switch to the on state and turn the first switch, the fourth switch, and the fifth switch to the off state in a first period,
turn the third switch to the off state and turn the fifth switch to the on state in a second period subsequent to the first period,
turn the fourth switch to the on state in a third period subsequent to the second period,
turn the fourth switch to the off state in a fourth period subsequent to the third period, and
the processor is further configured to determine the third value based on the pixel voltage in the second period and the pixel voltage in the fourth period.

2. The imaging apparatus according to claim 1, wherein the processor is further configured to:
perform a first AD conversion based on the pixel voltage in the second period to generate a first digital value,
perform a second AD conversion based the pixel voltage in the fourth period to generate a second digital value, and
determine the third value based on the first digital value and the second digital value.

3. The imaging apparatus according to claim 1, wherein the driving section is further configured to:
turn the third switch and the fifth switch to the on state in a fifth period subsequent to the fourth period,
turn the third switch and the fifth switch to the off state in a sixth period subsequent to the fifth period, and
turn the third switch to the off state and turn the fifth switch to the on state in a seventh period subsequent to the sixth period, and
the processor is further configured to determine the fourth value based on the pixel voltage in the second period and the pixel voltage in the seventh period.

4. The imaging apparatus according to claim 1, wherein the driving section is further configured to:
turn the third switch and the fifth switch to the on state in a fifth period subsequent to the fourth period,
turn the third switch and the fifth switch to the off state in a sixth period subsequent to the fifth period, and
turn the third switch to the off state and turn the fifth switch to the on state in a seventh period subsequent to the sixth period, the second period includes a first sub-period and a second sub-period subsequent to the first sub-period, and
the processor is further configured to:
determine the third value based on the pixel voltage in the second sub-period of the second period and the pixel voltage in the fourth period, and
determine the fourth value based on the pixel voltage in the first sub-period of the second period and the pixel voltage in the seventh period.

5. The imaging apparatus according to claim 1, wherein the driving section is further configured to:
turn the second switch and the third switch to the on state and turn the first switch, the fourth switch, and the fifth switch to the off state in an eighth period,
turn the second switch to the on state and turn the third switch to the off state in a ninth period subsequent to the eighth period,
turn the second switch to the off state in a tenth period subsequent to the ninth period,
turn the first switch to the on state in an eleventh period subsequent to the tenth period,
turn the first switch to the off state in a twelfth period subsequent to the eleventh period, and
turn the second switch to the on state in a thirteenth period subsequent to the twelfth period and prior to the first period, and the processor is further configured to:
determine the first value based on the pixel voltage in the tenth period and the pixel voltage in the twelfth period, and
determine the second value based on the pixel voltage in the ninth period and the pixel voltage in the thirteenth period.

6. The imaging apparatus according to claim 1, wherein the processor is further configured to generate the pixel value based on
the first value in a case where luminance is lower than a first luminance value,
the first value and the second value in a case where the luminance is higher than the first luminance value and lower than a second luminance value,
the first value, the second value, and the third value in a case where the luminance is higher than the second luminance value and lower than a third luminance value, and
the first value, the second value, the third value, and the fourth value in a case where the luminance is higher than the third luminance value.

7. The imaging apparatus according to claim 1, wherein a light reception region of the first light-receiving device is wider than a light reception region of the second light-receiving device.

8. The imaging apparatus according to claim 1, wherein the first charge accumulation section includes a diffusion layer.

9. The imaging apparatus according to claim 1, wherein the processor includes:
a reference signal generator configured to generate a reference signal of which a voltage level varies,
a comparing section configured to compare the pixel voltage with the reference signal to generate a comparison signal, and a counter configured to perform a counting operation based on the comparison signal to generate a digital value.

10. An imaging method, comprising:

driving respective switches of an imaging pixel, the imaging pixel including a first light-receiving device and a second light-receiving device, a first charge accumulation section and a second charge accumulation section, a first switch, a second switch, a third switch, a fourth switch, a fifth switch, and an output section, the first switch that is turned to an on state to couple the first light-receiving device and the first charge accumulation section to each other, the second switch that is turned to the on state to couple a predetermined node and the first charge accumulation section to each other, the third switch that is turned to the on state to apply a predetermined voltage to the predetermined node, the fourth switch that is turned to the on state to couple the second light-receiving device and the second charge accumulation section to each other, the fifth switch that is turned to the on state to couple the second charge accumulation section and the predetermined node to each other, and the output section that outputs a pixel voltage corresponding to a voltage in the first charge accumulation section;

determining a first value, a second value, a third value, and a fourth value based on the pixel voltage, and generating a pixel value based on the first value, the second value, the third value, and the fourth value;

turning the second switch and the third switch to the on state and turning the first switch, the fourth switch, and the fifth switch to the off state in a first period;

turning the third switch to the off state and turning the fifth switch to the on state in a second period subsequent to the first period;

turning the fourth switch to the on state in a third period subsequent to the second period;

turning the fourth switch to the off state in a fourth period subsequent to the third period; and determining the third value based on the pixel voltage in the second period and the pixel voltage in the fourth period.

* * * * *